US012160056B2

(12) United States Patent
Cams et al.

(10) Patent No.: US 12,160,056 B2
(45) Date of Patent: Dec. 3, 2024

(54) EASY MOUNTING CABLE GROUNDING ASSEMBLIES FOR TELECOMMUNICATIONS ENCLOSURES

(71) Applicant: COMMSCOPE TECHNOLOGIES LLC, Hickory, NC (US)

(72) Inventors: Eddy Luc Cams, Bilzen (BE); Johan Geens, Bunsbeek (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 122 days.

(21) Appl. No.: 17/786,761

(22) PCT Filed: Dec. 14, 2020

(86) PCT No.: PCT/US2020/064821
§ 371 (c)(1),
(2) Date: Jun. 17, 2022

(87) PCT Pub. No.: WO2021/126751
PCT Pub. Date: Jun. 24, 2021

(65) Prior Publication Data
US 2023/0025315 A1    Jan. 26, 2023

Related U.S. Application Data

(60) Provisional application No. 62/950,462, filed on Dec. 19, 2019.

(51) Int. Cl.
H01R 11/05      (2006.01)
G02B 6/44       (2006.01)
H01R 4/66       (2006.01)
H01R 4/30       (2006.01)

(52) U.S. Cl.
CPC .......... *H01R 11/05* (2013.01); *G02B 6/4441* (2013.01); *H01R 4/66* (2013.01); *H01R 4/308* (2013.01)

(58) Field of Classification Search
None
See application file for complete search history.

(56) References Cited

U.S. PATENT DOCUMENTS

| | | |
|---|---|---|
| 6,853,796 B2 | 2/2005 | Vastmans et al. |
| 7,492,996 B2 | 2/2009 | Kowalczyk et al. |
| 7,720,343 B2 | 5/2010 | Barth et al. |

(Continued)

FOREIGN PATENT DOCUMENTS

| | | |
|---|---|---|
| EP | 2 834 693 B1 | 1/2022 |
| WO | 01/53859 A1 | 7/2001 |

(Continued)

OTHER PUBLICATIONS

EP International Search Report for PCT Appln. No. 20900842.4 dated Nov. 28, 2023 (11 pages).

(Continued)

*Primary Examiner* — Jerry Rahll
(74) *Attorney, Agent, or Firm* — Merchant & Gould P.C.

(57) ABSTRACT

Electrical grounding assemblies for electrically grounding cables in cable closures. A grounding unit of the grounding assembly can serve as a common ground connection to multiple cables. The grounding unit includes mounting features that allow it to be easily mounted and unmounted from a slotted base plate positioned within the cable closure.

23 Claims, 26 Drawing Sheets

(56) References Cited

U.S. PATENT DOCUMENTS

| | | | |
|---|---|---|---|
| 8,903,216 | B2 | 12/2014 | Thompson et al. |
| 9,256,042 | B2 | 2/2016 | Vastmans |
| 9,983,377 | B2 | 5/2018 | Dellinger et al. |
| 10,379,310 | B2 | 8/2019 | Aznag et al. |
| 10,483,660 | B2 | 11/2019 | Liefsoens et al. |
| 10,651,608 | B2 | 5/2020 | White |
| 10,777,953 | B2 | 9/2020 | White et al. |
| 11,194,112 | B2 | 12/2021 | Collart et al. |
| 2005/0215090 | A1 | 9/2005 | Harwood |
| 2013/0163944 | A1 | 6/2013 | Krampotich |
| 2017/0003467 | A1 | 1/2017 | Jaksons et al. |
| 2018/0157002 | A1 | 6/2018 | Bishop et al. |
| 2018/0261986 | A1* | 9/2018 | Kempeneers ............ H01R 4/38 |
| 2020/0073071 | A1 | 3/2020 | Allen et al. |

FOREIGN PATENT DOCUMENTS

| | | |
|---|---|---|
| WO | 2009/040566 A1 | 4/2009 |
| WO | 2013/149922 A1 | 10/2013 |
| WO | 2019/219827 A1 | 11/2019 |
| WO | 2020/154418 A1 | 7/2020 |
| WO | 2020/172153 A1 | 8/2020 |

OTHER PUBLICATIONS

International Search Report and Written Opinion of the International Searching Authority for International Patent Application No. PCT/US2020/064821 mailed Mar. 31, 2021, 11 pages.

* cited by examiner

EASY MOUNTING CABLE GROUNDING ASSEMBLIES FOR TELECOMMUNICATIONS ENCLOSURES

CROSS-REFERENCE TO RELATED APPLICATION

This application is a National Stage Application of PCT/US2020/064821, filed on Dec. 14, 2020, which claims the benefit of U.S. Patent Application Ser. No. 62/950,462, filed on Dec. 19, 2019, the disclosures of which are incorporated herein by reference in their entireties. To the extent appropriate, a claim of priority is made to each of the above disclosed applications.

TECHNICAL FIELD

The present disclosure relates to telecommunications enclosures, and more particularly to devices for grounding telecommunications cables that are fixed to telecommunications enclosures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables entering the enclosure through ports in the enclosure wall, corresponding sealing blocks positioned at the port locations of the enclosure can include sealing blocks that define cable passages such that the sealing blocks can be compressed around the cable forming a seal.

Typically, cables entering telecommunications enclosures must be fixed in place inside the enclosure. Within the closure, and depending on the type of cable, protective components of the cable, such as a jacket, a buffer tube, strength members, etc., are stripped, truncated, or removed, allowing the optical fibers held by the cable to be managed within the closure.

In addition, in certain applications or locations, there is a need to electrically ground certain telecommunications enclosures. The electrical grounding may be used to dissipate static electricity, provide a return path for electrical power, provide a safety ground in case of equipment malfunction, etc. Certain enclosure housings are made of electrically non-conductive material (e.g., plastic, fiberglass, etc.). As the enclosure/housing may not readily conduct electricity, a grounding cable may be passed through a port of the housing/enclosure and conductively couple to electrically conductive portions of a telecommunications cable that is fixed inside the closure. Specific grounding requirements for enclosures such as telecommunications enclosures can vary depending on applicable laws and regulations. Portions of optical cables fixed to a closure that can be grounded include, e.g., one or more electrically conductive strength rods of the cables and a conductive shield that extends along the axis of the cable and radially surrounds the cable's optical fibers.

SUMMARY

In general terms, the present disclosure is directed to improvements in grounding of cables from inside telecommunications closures. The grounding assemblies and connections described herein can provide increased efficiency and simplicity when installing and de-installing the grounding assemblies.

According to an aspect of the present disclosure, a grounding unit includes a main body, a coupling portion for coupling a grounding conductor from a cable fixation assembly, and a mounting portion that structurally resembles a mounting portion of the cable fixation assembly.

In some examples, the mounting portion includes a plurality of legs and feet extending from the legs that define hook elements for hooking the grounding unit to a slotted base plate positionable and affixable within a telecommunications closure.

According to certain aspects of the present disclosure, an electrical grounding assembly for a telecommunications closure, comprises: a grounding unit extending vertically from a top to a bottom and including: a main body; a grounding conductor coupler supported by the main body; and a mounting portion supported by the main body, the mounting portion including a plurality of grounding unit hook elements, the grounding unit hook elements being configured to engage slots of a base plate.

In some examples, the assembly includes a base plate having a top surface and a bottom surface and a plurality of slots extending through the top surface and the bottom surface that receive the grounding unit hook elements.

In some examples, the assembly includes a base plate assembly, including: a support member defining a first region and a second region adjacent the first region, the first region including a plurality of first slots extending between an upper surface and a lower surface of the first region, the first slots configured to engage the grounding unit hook elements to lockingly mount the grounding unit to the support member; and a first plate arrangement coupled to the support plate member and positioned at the second region, the first plate arrangement including a plurality of second slots extending between an upper surface and a lower surface of the first plate arrangement, the second slots being configured to engage hook elements of at least one first cable fixation assembly, the first plate arrangement and the second region of the support member defining a first vertical space therebetween to accommodate the hook elements of the at least one first cable fixation assembly.

In some examples, the assembly is positioned within a closure volume defined by housing pieces of a telecommunications closure.

The following patent documents are hereby incorporated by reference in their entireties: U.S. Patent Application Publication No. 2018/0261986, U.S. Patent Application Publication No. 2020/0073071, PCT Patent Application Publication No. WO2020/154418 and PCT Patent Application Publication No. WO2020/172153.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will be hereinafter described in conjunction with the appended drawings, wherein like numerals denote like elements.

DETAILED DESCRIPTION

Figure 1:
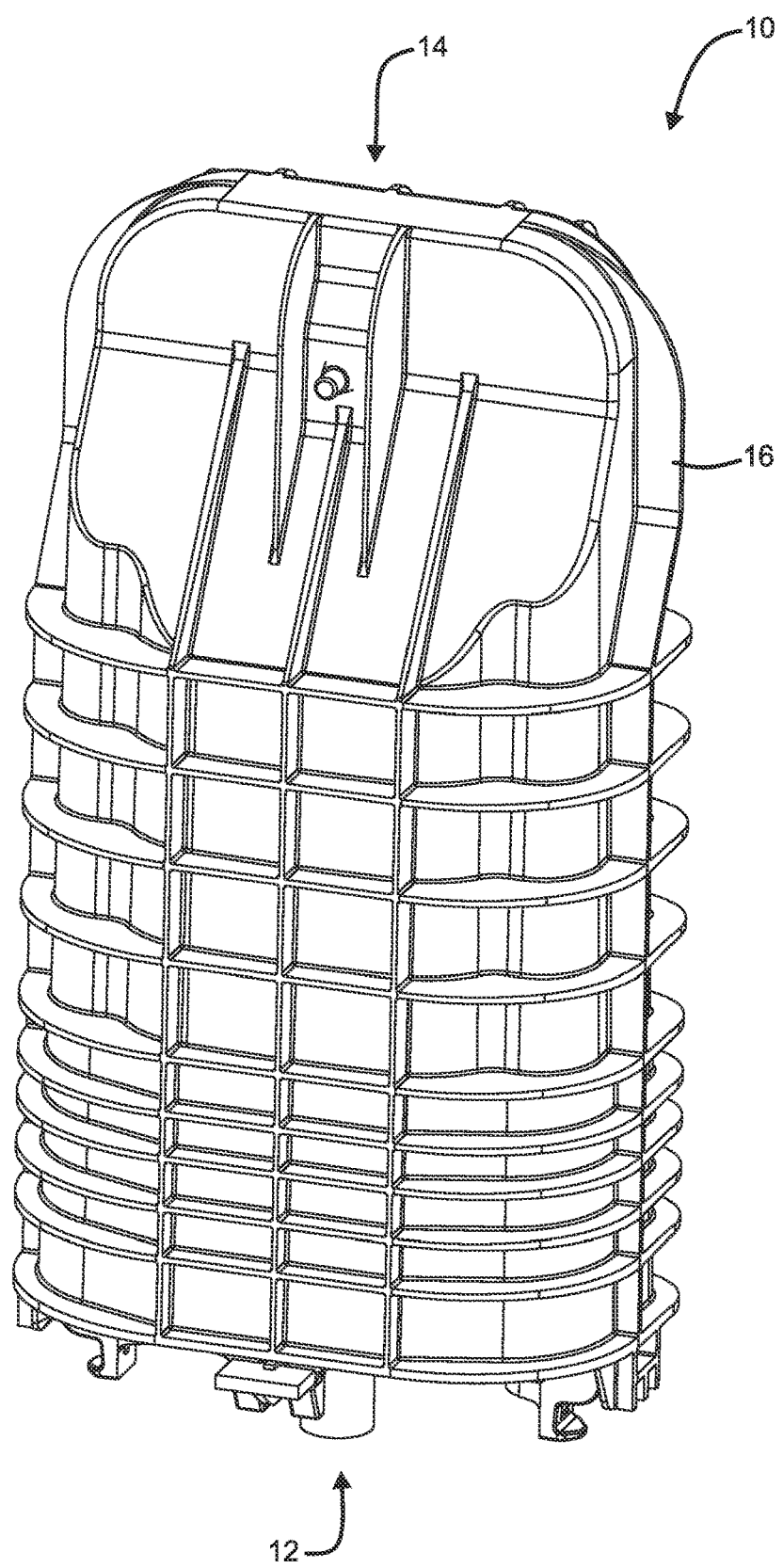
FIG. 1 is a perspective view of an example telecommunications closure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
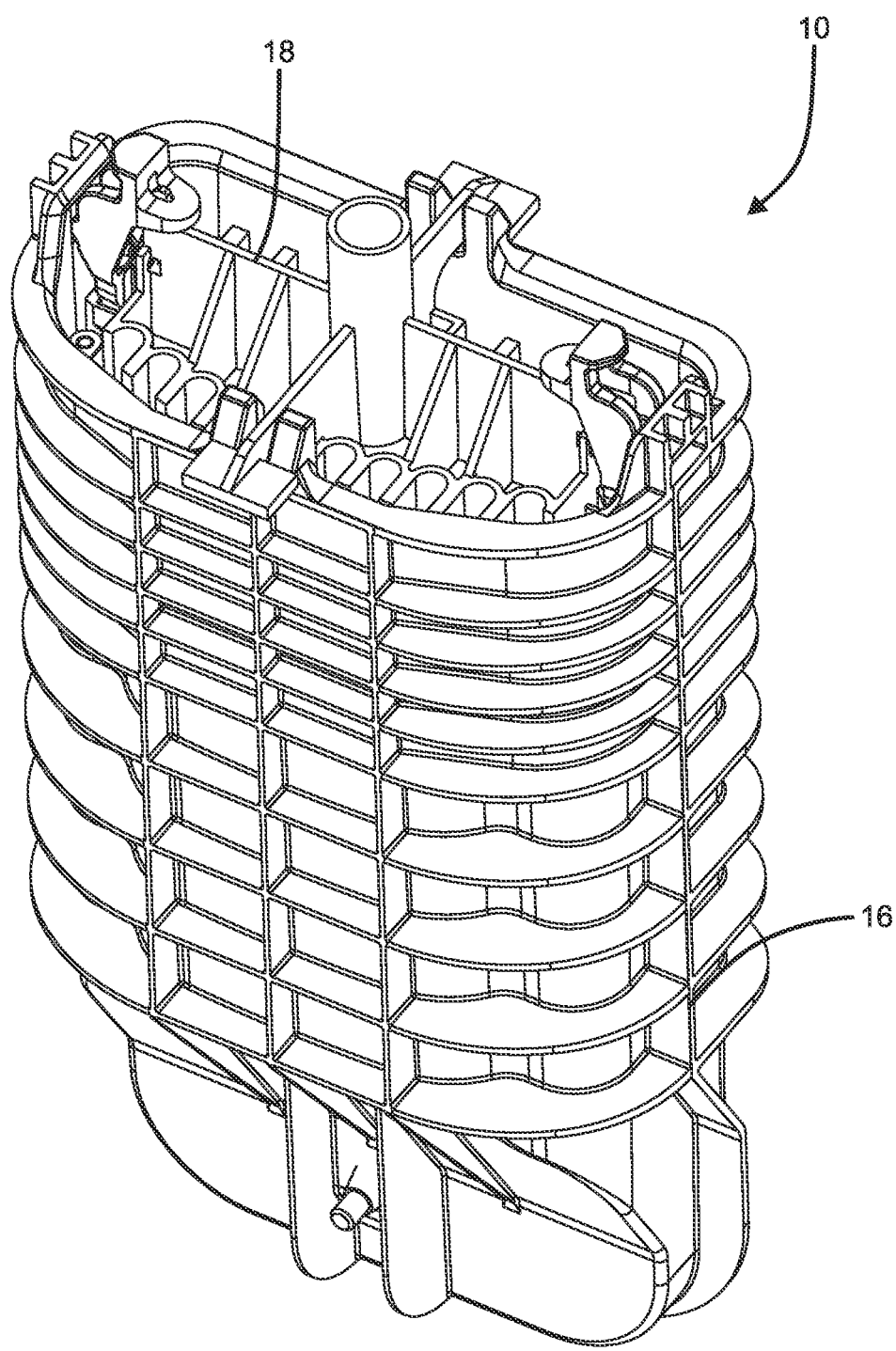
FIG. 2 is a further perspective view of the telecommunications closure of FIG. 1.

Referring to FIGS. 1-2, a telecommunications closure 10 extends from a proximal end 12 to a distal end 14. The closure 10 includes a first housing piece 16 and a second housing piece 18 that are configured to cooperate to form a sealable and re-enterable closure volume. The closure volume houses and supports telecommunications equipment, such as optical fiber storage, routing, splicing, splitting, and/or indexing equipment. One or more network side cables enter the closure volume through sealed ports in the second housing piece 18. Within the closure, optical fibers from the network side cables can be managed and, optionally, spliced or otherwise connected to optical fibers of subscriber side cables that also enter the closure volume through sealed ports in the second housing piece 18.

To protect the integrity of the seals, as well as to protect the delicate optical fibers from external loads, distal ends of the cables entering the closure volume are fixed using cable fixation assemblies positioned within the closure volume. Cables that have strength members, such as one or more rigid rods or yarn (e.g., aramid yarn) are also fixed in place using the cable fixation assemblies. In addition, in certain applications, one or more of the cables must be connected to an electrical ground extending outside of the closure volume. One or more cable components can be connected to electrical ground (e.g., grounded) depending on the type of cable. For example, some cables include a metallic conductive shield surrounding the cable's longitudinal axis and the optical fibers carried by the cable. Some cables include one or more metallic strength rods that run generally parallel to the cable's longitudinal axis. Such shields and strength rods can be grounded using a grounding assembly in accordance with the present disclosure. Some cables include a conductive shield and one or more metallic strength rods, both of which can be grounded using a grounding assembly in accordance with the present disclosure.

Referring to FIGS. 3-10, a cable termination assembly 20 in accordance with the present disclosure is shown and will be described. The cable termination assembly 20 is configured to be housed within the closure volume of the closure 10 of FIGS. 1-2, with portions of the cables and the grounding rod extending outside of the closure 10 and proximally away from the closure 10.

The cable termination assembly 20 extends between a proximal end 22 and a distal end 24, between a top 26 and a bottom 28, and between a first side 30 and an opposite second side 32.

The assembly 20 includes a support member 34. The support member supports first and second plate arrangements 36 and 38 on opposite sides of a divider 40. One or more cable fixation assemblies can be mounted at side by side mounting positions defined by each of the plate arrangements 36 and 38. In the example shown, the first plate arrangement 36 is toward the first side 30 of the assembly 20 and supports three cable fixation assemblies 42, 44, 46, with the cable fixation assemblies 44 and 46 being identical. In some examples, the support member 34 is constructed of a non-electrically conductive material. In some examples, the support member 34 is constructed of an electrically conductive material.

Figure 13:
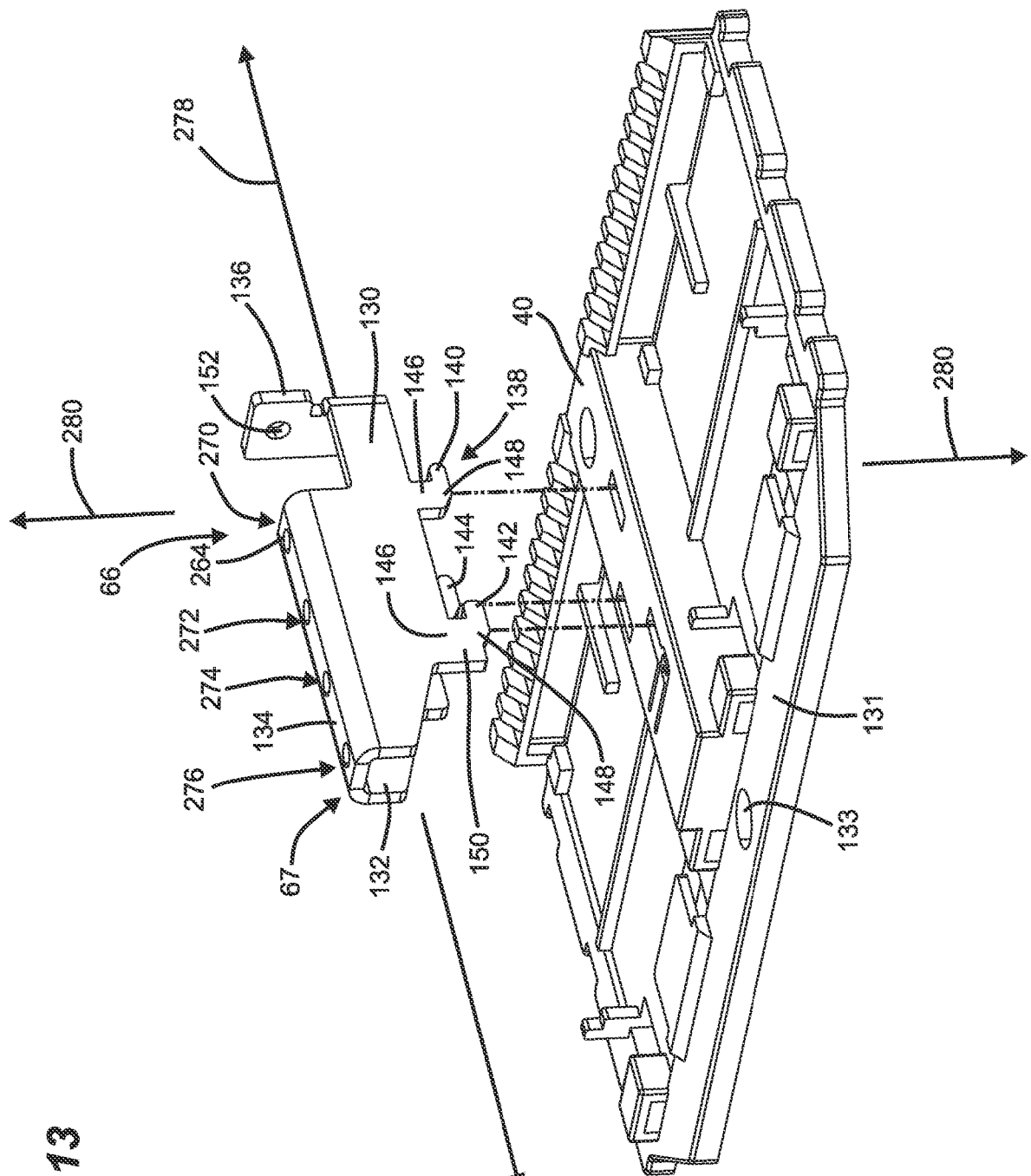
FIG. 13 is a perspective view of the support member of FIG. 10 and the grounding unit of the cable termination assembly of FIG. 3, the support member and the grounding unit being in an unassembled configuration.

The fixation assembly 42 fixes a feeder cable 48 that holds multiple optical fibers 51 that can be managed within the closure volume and connected to fibers of distribution cables. The fixation assembly includes an electrically conductive body 50 that has a cable jacket anchoring portion 52 and a strength rod anchoring portion 54. Extending downward from the body 50 are hook elements 55 that lockingly engage slots of the plate arrangement 36. The strength rod anchoring portion 54 includes a bracket 56, a platform 58 and a fastener 60 (e.g., a metal screw), which cooperate to securely hold a distal end portion of the strength rod 62 of the cable 48. A grounding conductor 64 (partially schematically illustrated) is connected at one end to the strength rod anchoring portion 54 and at an opposite end to a grounding unit 66 at a grounding conductor coupler 260, which can include an electrically conductive threaded fastener 262 that is threadably secured to the grounding unit 66 in a hole 264 (FIG. 13) of the grounding unit 66. The ends of the grounding conductor 64 can be terminated at electrically conductive eyelets, such as the eyelet 68, through which the fastener 262 can be inserted to secure the eyelet 68 to the grounding unit 66. In this manner, an electrical current in the strength rod 62 can be conducted through the electrically conductive strength rod anchoring portion to the grounding conductor 64 and to the grounding unit 66, which includes a grounding rod 70 connected to ground outside of the closure. The grounding conductor 64 can be any suitable electrically conductive component that is capable of carrying sufficient electrical current without overloading (e.g., without melting, burning, etc.). In some examples, the grounding conductor 64 is a braid of metallic threads or strands. In other examples, the grounding conductor 64 includes a metallic wire or a rigid metallic bar or bracket.

In some examples, the cable 48 includes a conductive shield that can be grounded via a grounding conductor connecting the cable jacket anchoring portion 52 to the grounding unit 66. A portion of the outer jacket 49 of the cable 48 can be removed to expose the conductive shield, and an electrical pathway then can be established between the shield and the grounding unit 66 via the cable jacket anchoring portion 52. The cable jacket 49 is secured to the cable jacket anchoring portion 52 with a clamp 53. In some examples, the cable 48 includes dual metallic strength rods extending parallel to each other on opposite sides of the cable's longitudinal axis 53.

The grounding unit 66 can include any suitable number of grounding conductor couplers for coupling grounding conductors whose opposite ends are connected to cable fixation assemblies or cables. For example, for larger closures that handle larger numbers of cables or for closures that handle cables having multiple grounding components (e.g., strength rods and a conductive shield) a grounding unit can include a greater number of grounding conductor couplers. In the example shown (FIG. 13), the grounding unit 66 includes four grounding conductor couplers at four locations 270, 272, 274, 276 along a longitudinal (proximal to distal) axis 278 of the grounding unit 66.

In alternative examples, more or fewer (e.g., one, two, three, five, six, seven, eight, or more) grounding conductor couplers can be provided on a given grounding unit. The four locations 270, 272, 274, 276 defined by the grounding unit 66 are all at the same vertical height along the vertical axis 280 of the grounding unit 66. In alternative examples, locations of grounding conductor couplers can be at different vertical levels of a grounding unit. Vertically differentiated grounding conductor coupler locations can, e.g., reduce interference in routing and connecting of grounding conductors between cables and the grounding conductor unit. In addition, vertically differentiated grounding conductor coupler locations can better serve cables of different sizes, e.g., with smaller distribution cables being connected by grounding conductors to relatively lower grounding conductor coupler locations of the grounding unit, and larger feeder cables being connected by grounding conductors to relatively higher grounding conductor coupler locations of the grounding unit, which can also reduce the amount of length required for the grounding conductors.

Figure 24:
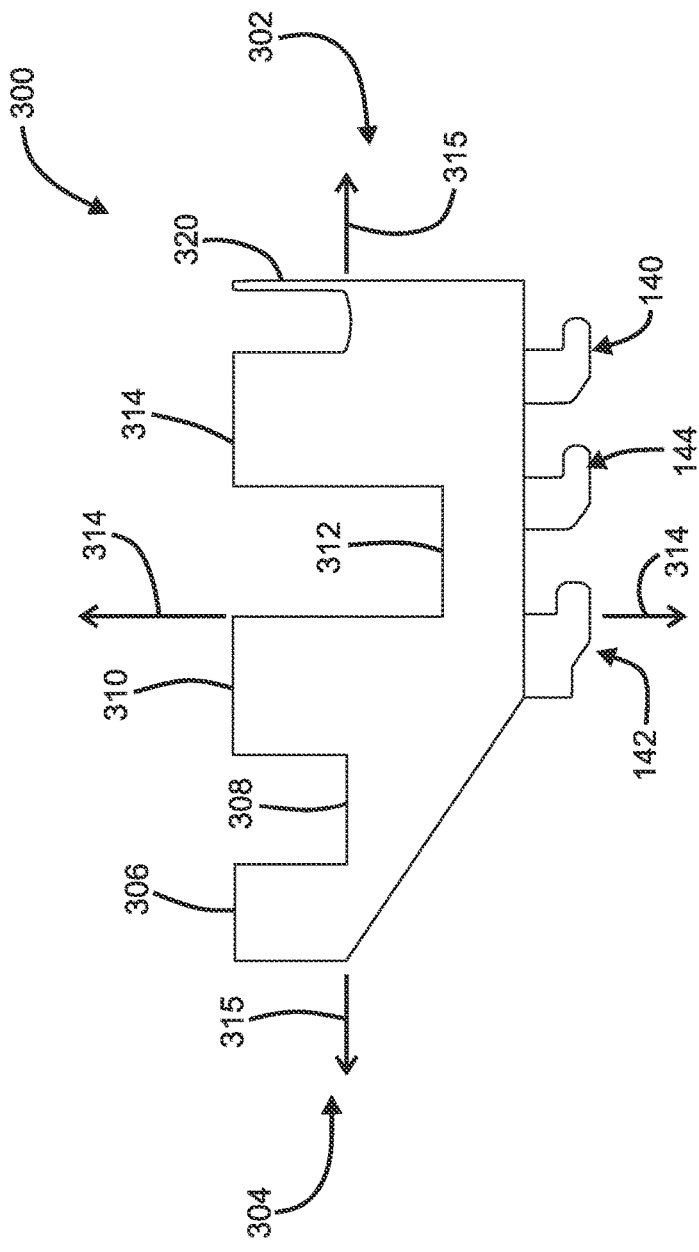
FIG. 24 is a schematic side view of a further example grounding unit in accordance with the present disclosure.

The grounding unit 300 of FIG. 24 includes vertically differentiated grounding conductor coupler locations 306, 308, 310, 312 and 314. The grounding unit 300 extends from a proximal end 302 to a distal 304 along a longitudinal axis 315, and extends vertically along a vertical axis 314. The grounding unit 300 also includes a grounding rod interface 320, and a mounting portion consisting of hook elements that is identical to the mounting portion of the grounding unit 66.

In alternative examples, locations of grounding conductor couplers can be at different transverse positions of a grounding unit (optionally, in addition to being at different vertical positions). Transversely differentiated grounding conductor coupler locations can, e.g., reduce interference in routing and connecting of grounding conductors between cables and the grounding conductor unit, e.g., by connecting grounding conductors of cables on one side of the grounding unit to couplers positioned toward that side, and connecting grounding conductors of cables on the opposite side of the grounding unit to couplers positioned toward the opposite side of the grounding unit. In this manner, transversely differentiated grounding conductor coupler locations can also reduce the length of the grounding conductors required.

Figure 25:
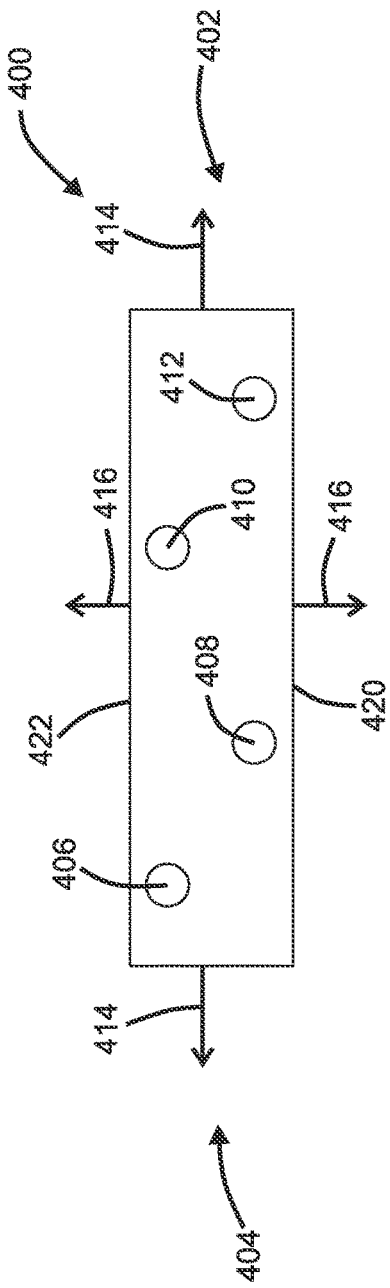
FIG. 25 is a schematic top view of a further example grounding unit in accordance with the present disclosure.

The grounding unit 400 of FIG. 25 includes transversely differentiated grounding conductor coupler locations 406, 408, 410 and 412. The grounding unit 400 extends from a proximal end 402 to a distal end 404 along a longitudinal axis 414, and extends transversely along a transverse axis 416 (transverse to the longitudinal axis 414). The grounding conductor coupler locations 408 and 412 can serve cables fixed on the side 420 of the grounding unit 400, while the grounding conductor coupler locations 406 and 410 can serve cables fixed on the side 422 of the grounding unit 400.

Regardless of the grounding conductor coupler location configuration of a given grounding unit, the mounting portion of the grounding unit can be uniform, e.g., having the configuration of the mounting portions of both the grounding units 66 and 300, simplifying assembly of different telecommunications closures due to the interchangeability of the mounting portions of the grounding unit and the cable fixation assemblies, which mount to slotted surfaces in the same manner as the grounding unit.

The grounding unit 66 can accommodate coupling a single grounding conductor at each grounding conductor coupler or multiple (e.g., two, three, four or more) grounding conductors at a single grounding conductor coupler, e.g., by stacking multiple conductor terminating eyelets atop one another about the shaft of the threaded fastener of the grounding conductor coupler.

Each of the fixation assemblies 44 and 46 terminates two distribution cables 72. The distribution cables 72 do not include metallic strength rods or conductive shields, and need not be grounded via the grounding unit 66. In some examples, the cables 72 include aramid yarn as a strength member which can be anchored by tying it to the bodies of the corresponding fixation assembly 44, 46. In some examples, the bodies of the fixation assemblies 44 and 46 are constructed of a non-electrically conductive material. The bodies of the fixation assemblies 44 and 46 include hooks for lockingly engaging the fixation assemblies 44 and 46 to the plate arrangement 36. The distribution cables 72 hold optical fibers and distribute signals thereby toward subscribers. The fibers of the distribution cables 72 can be spliced or otherwise connected to fibers of feeder cables fixed at the same assembly 20.

The second plate arrangement 38 is toward the second side 32 of the assembly 20 and supports three cable fixation assemblies 74, 76, 78, with the cable fixation assemblies 76 and 78 being identical.

The fixation assembly 74 fixes a feeder cable 80 that holds multiple optical fibers 81 that can be managed within the closure volume and connected to fibers of distribution cables. The fixation assembly 74 includes an electrically conductive body 82 that has a cable jacket anchoring portion 84 and a strength rod anchoring portion 86. Extending downward from the body 82 are hook elements 83 that lockingly engage slots of the plate arrangement 38. The strength rod anchoring portion 86 includes a bracket 88, a platform 90 and a fastener 92, which cooperate to securely hold a distal end portion of the strength rod 94 of the cable 80. A grounding conductor 96 is connected at one end to the strength rod anchoring portion 86 and at an opposite end to the grounding unit 66. The ends of the grounding conductor 96 can be terminated at electrically conductive eyelets. In this manner, an electrical current in the strength rod 94 can be conducted through the electrically conductive strength rod anchoring portion to the grounding conductor 96 (partially schematically illustrated) to the grounding unit 66 and out of the closure to ground via the grounding rod 70.

Each of the fixation assemblies 76 and 78 terminates one distribution cable 98. The distribution cables 98 include electrically conductive strength rods 100 that are grounded via the grounding unit 66 using grounding conductors 102, 104 (partially schematically illustrated) connected between strength rod anchoring portions 106 of the fixation assemblies 76, 78 and the grounding unit 66. At least a portion of the strength rod anchoring portion 106 is constructed of an electrically conductive material in order to establish the grounding pathway. The bodies of the fixation assemblies 76 and 78 include hooks for lockingly engaging the fixation assemblies 76 and 78 to the plate arrangement 36. The distribution cables 98 hold optical fibers and distribute signals thereby toward subscribers. The fibers of the distribution cables 98 can be spliced or otherwise connected to fibers of feeder cables fixed at the same assembly 20.

The distribution cables 98 are configured differently from the distribution cables 72. For example, the distribution cables 98 can carry greater data bandwidth than the distribution cables 72. The feeder cable 48 is configured differently from the feeder cable 80. For example, the feeder cable 48 can carry greater data bandwidth than the feeder cable 80.

Figure 7:
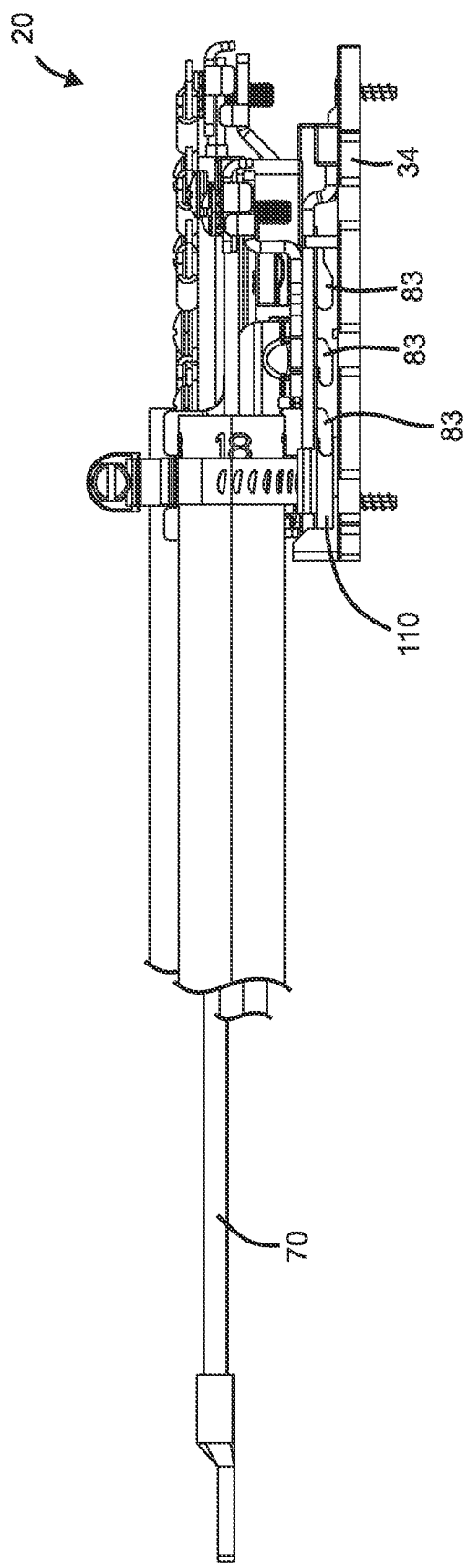
FIG. 7 is a side view of the cable termination assembly of FIG. 3.
Figure 8:
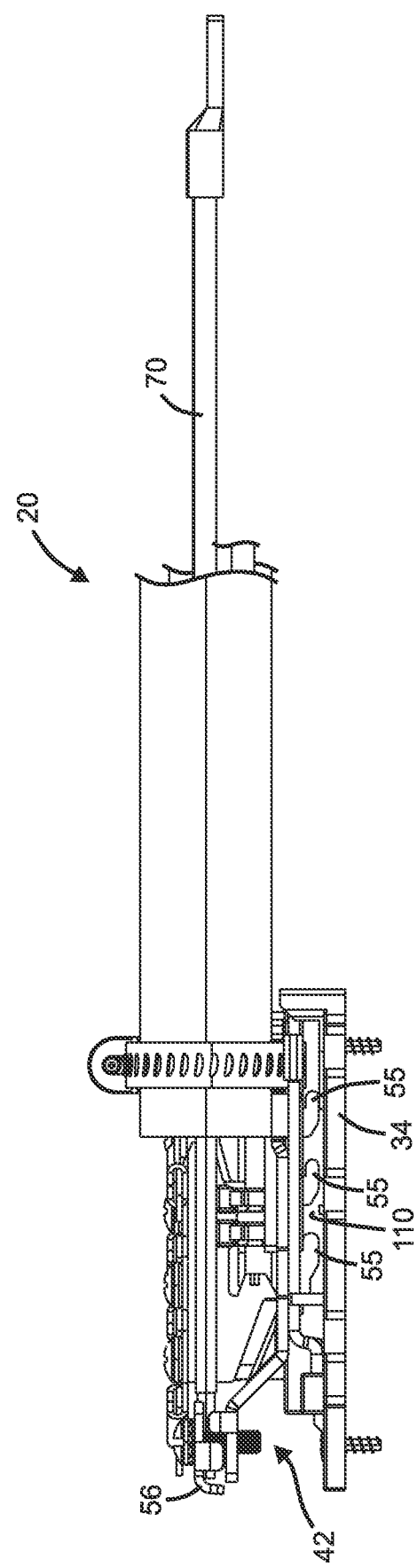
FIG. 8 is a further side view of the cable termination assembly of FIG. 3.
Figure 9:
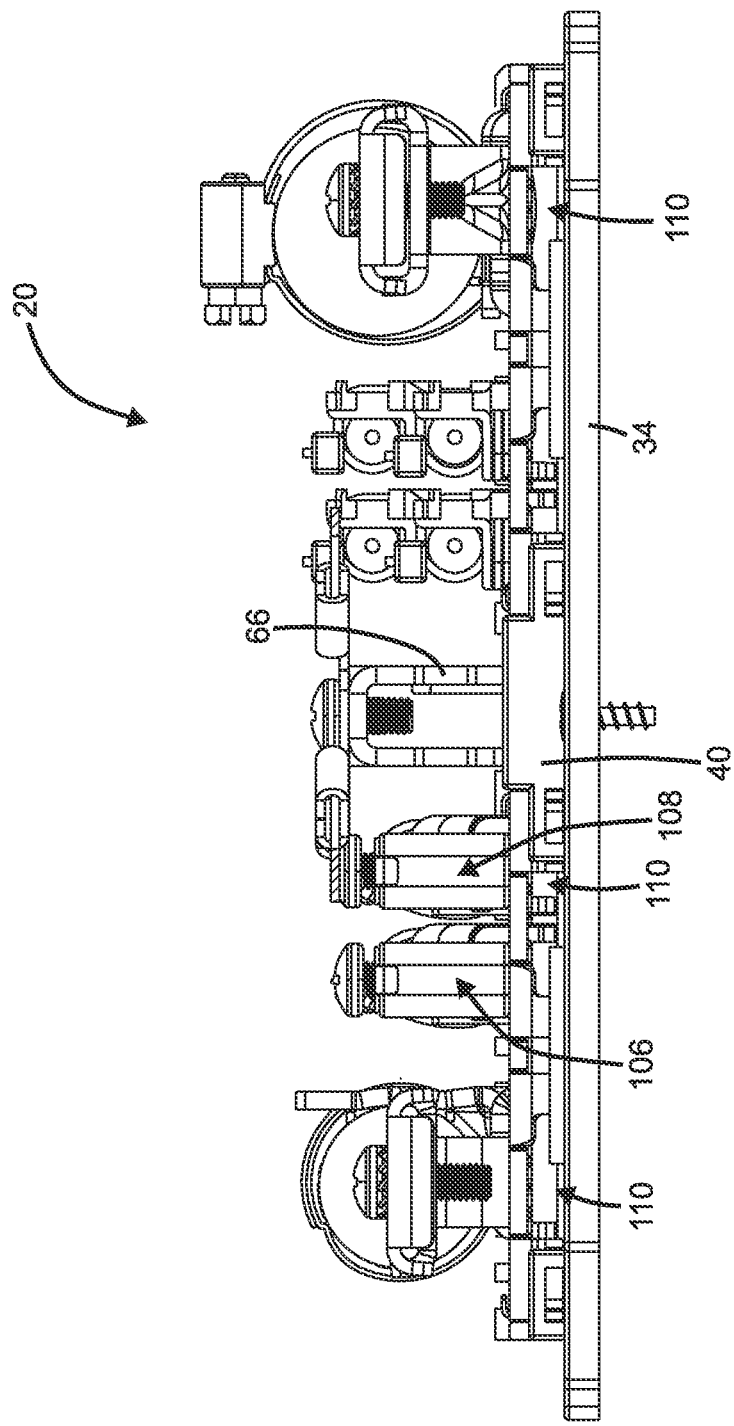
FIG. 9 is a distal end view of the cable termination assembly of FIG. 3.

The plate arrangements 36 and 38 are both mounted to the support member 34. Referring to FIGS. 7-9, the plate arrangements 36 and 38 includes legs that act as spacers creating a vertical space 110 between the support member 34 and the corresponding plate arrangement 36, 38. The mounting hook elements of the cable fixation assemblies can be accommodated in the vertical space 110 when the cable fixation assemblies are lockingly mounted to their respective plate arrangement 36, 38.

As illustrated in FIGS. 3-9, the grounding unit 66 serves as an electrical grounding conduit for a plurality of cables, including a plurality of different types and sizes of cables, positioned on different sides of the grounding unit 66 and affixed to the same overall assembly 20 as the grounding unit 66.

Figure 10:
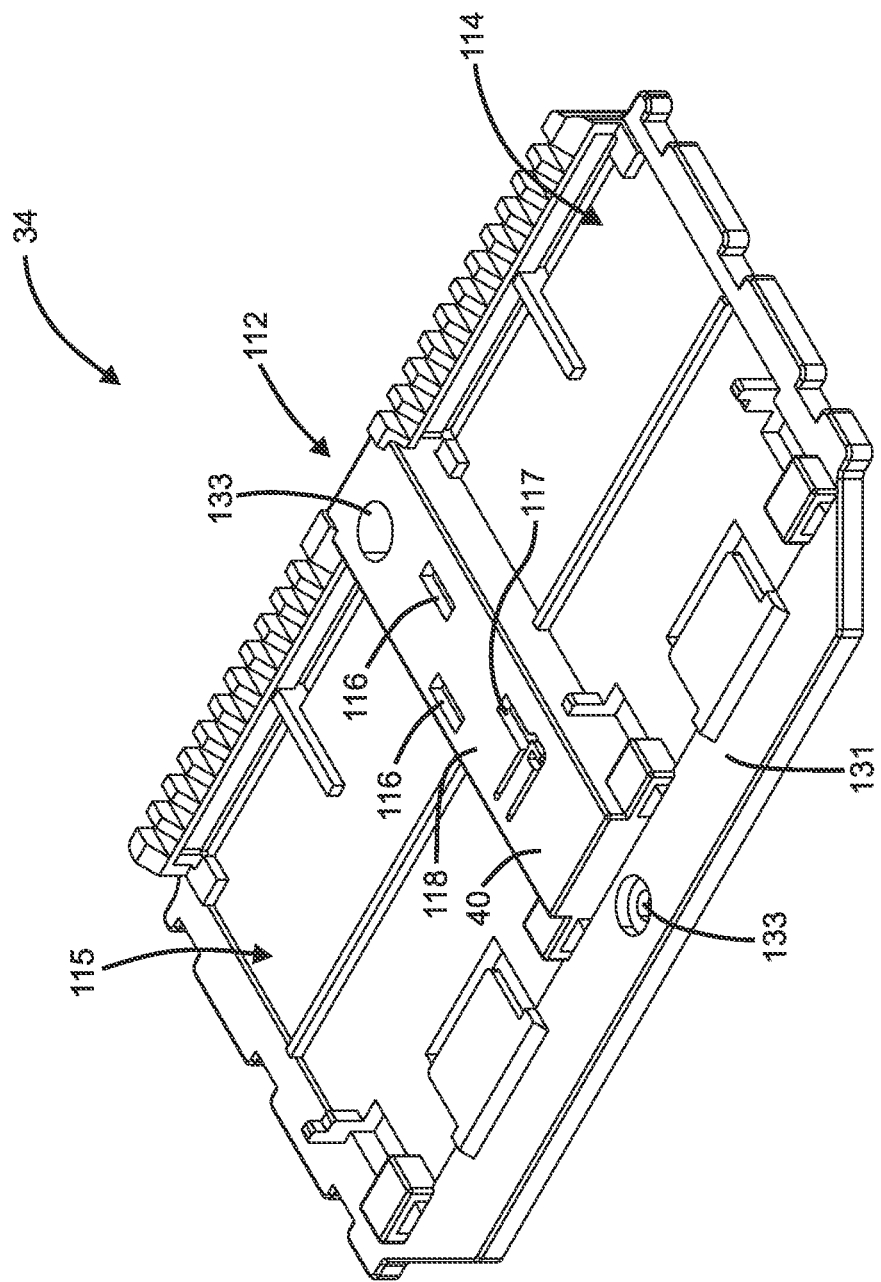
FIG. 10 is a perspective view of the support member of the base plate assembly of the cable termination assembly of FIG. 3.
Figure 11:
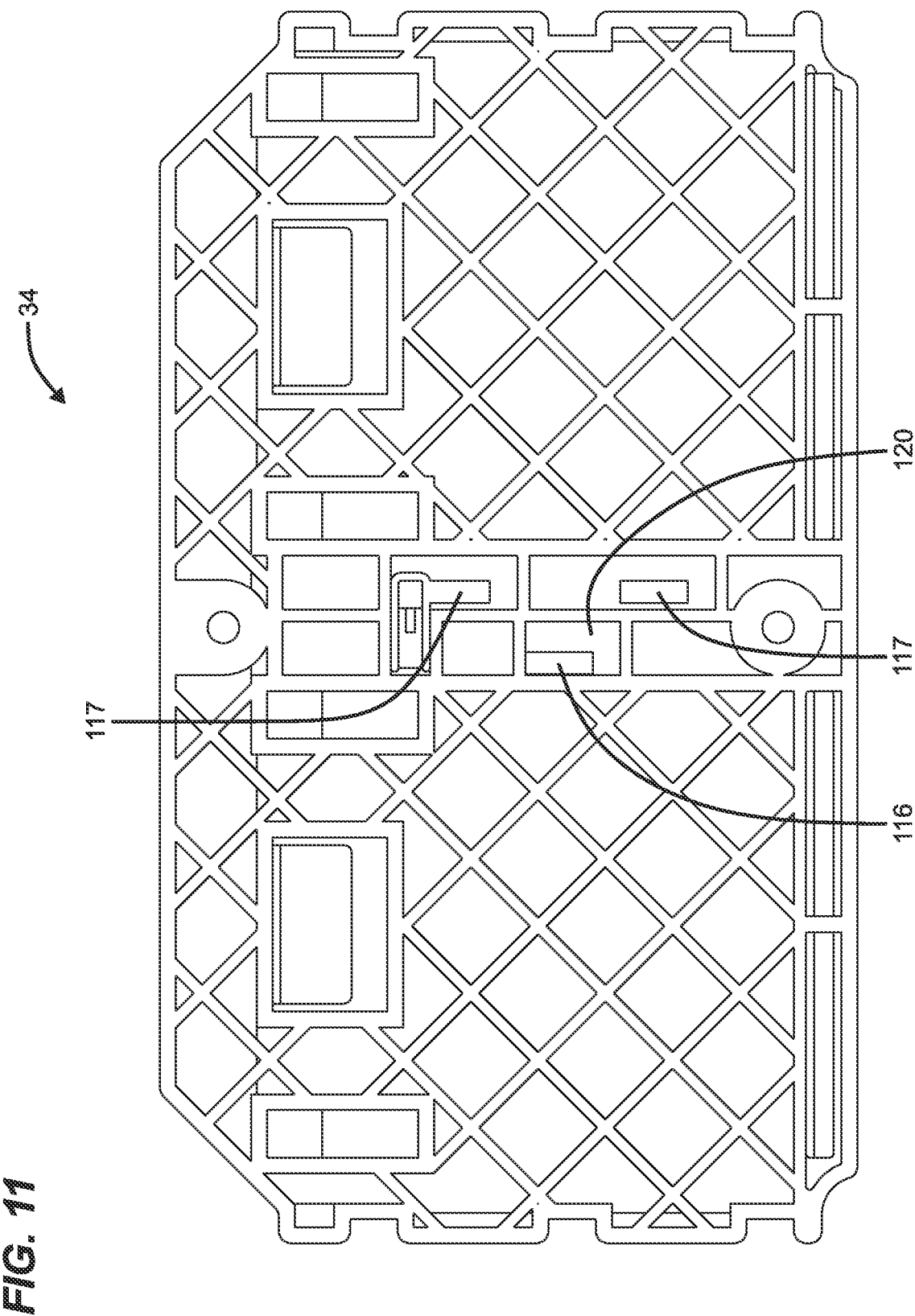
FIG. 11 is a bottom view of the support member of FIG. 10.
Figure 12:
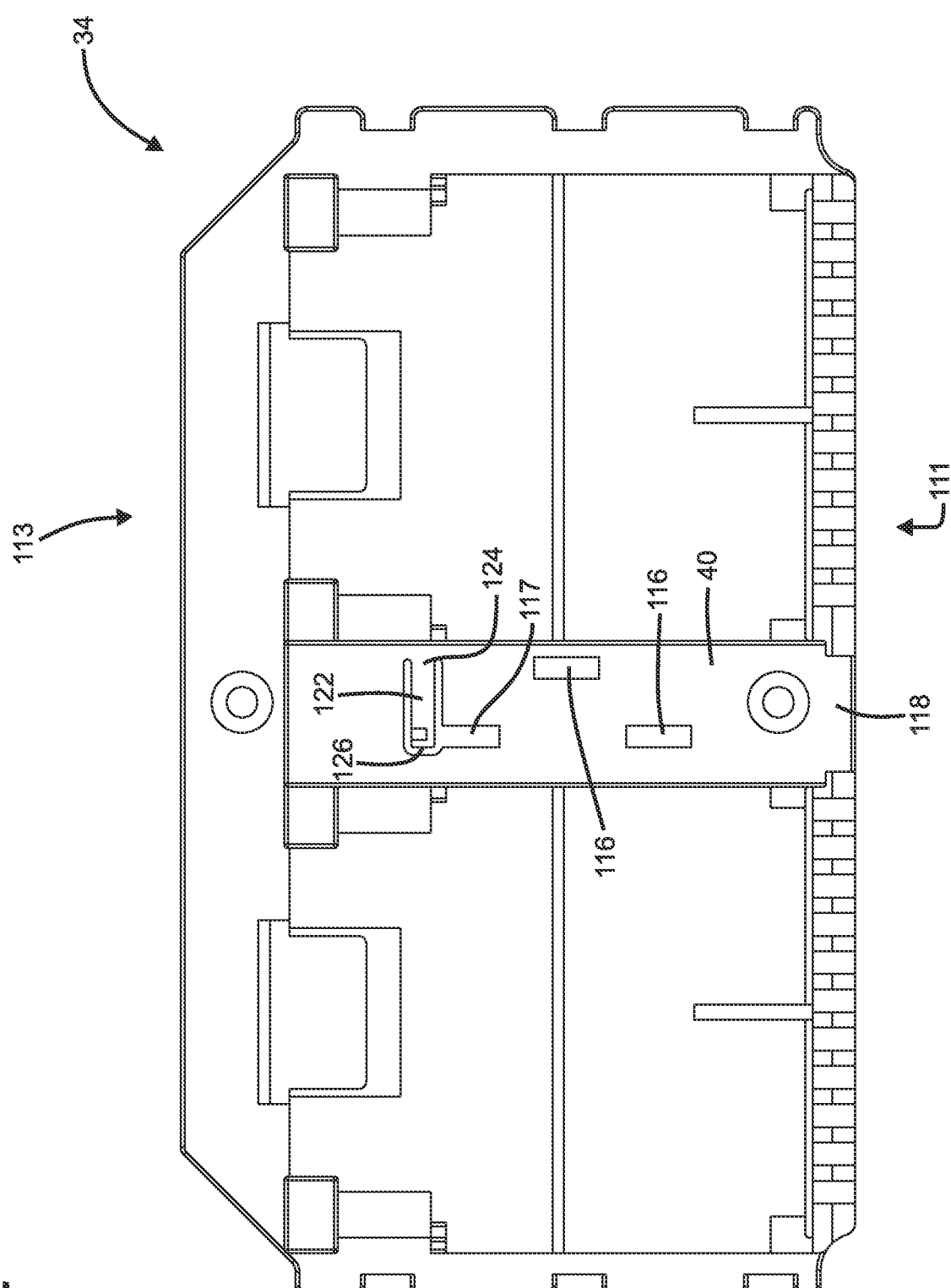
FIG. 12 is a top view of the support member of FIG. 10.

Referring now to FIGS. 10-12, the support member 34 will be described in more detail. The support member 34 extends from a proximal end 111 to a distal end 113. In some examples, the support member 34 is constructed of a non-electrically conductive material, e.g., molded from a polymeric material. The support member is configured to be mounted to a housing piece of a closure, e.g., by using a mounting flange 131 and mounting holes 133 that can receive fasteners (e.g., screws). The support member 34 defines a first region 112, a second region 114 adjacent the first region 112, and a third region 115, the second and third regions 114, 115 being disposed on opposite sides of the first region 112. The first region 112 includes a plurality of first slots 116, 117 extending between an upper surface 118 and a lower surface 120 of an upper wall 119 of the divider 40 positioned in the first region 112 of the support member 34. The slot 117 is a locking slot. The slots 116, 117 are configured to engage the grounding unit hook elements to lockingly mount the grounding unit to the support member. In particular, a resilient member 122 is positioned to cooperate with the locking slot 117. The resilient member 122 extends between a fixed end 124 and an opposite free end 126, and has a relaxed configuration (shown in FIGS. 15 and 17) and a flexed configuration (shown in FIG. 16).

Figure 3:
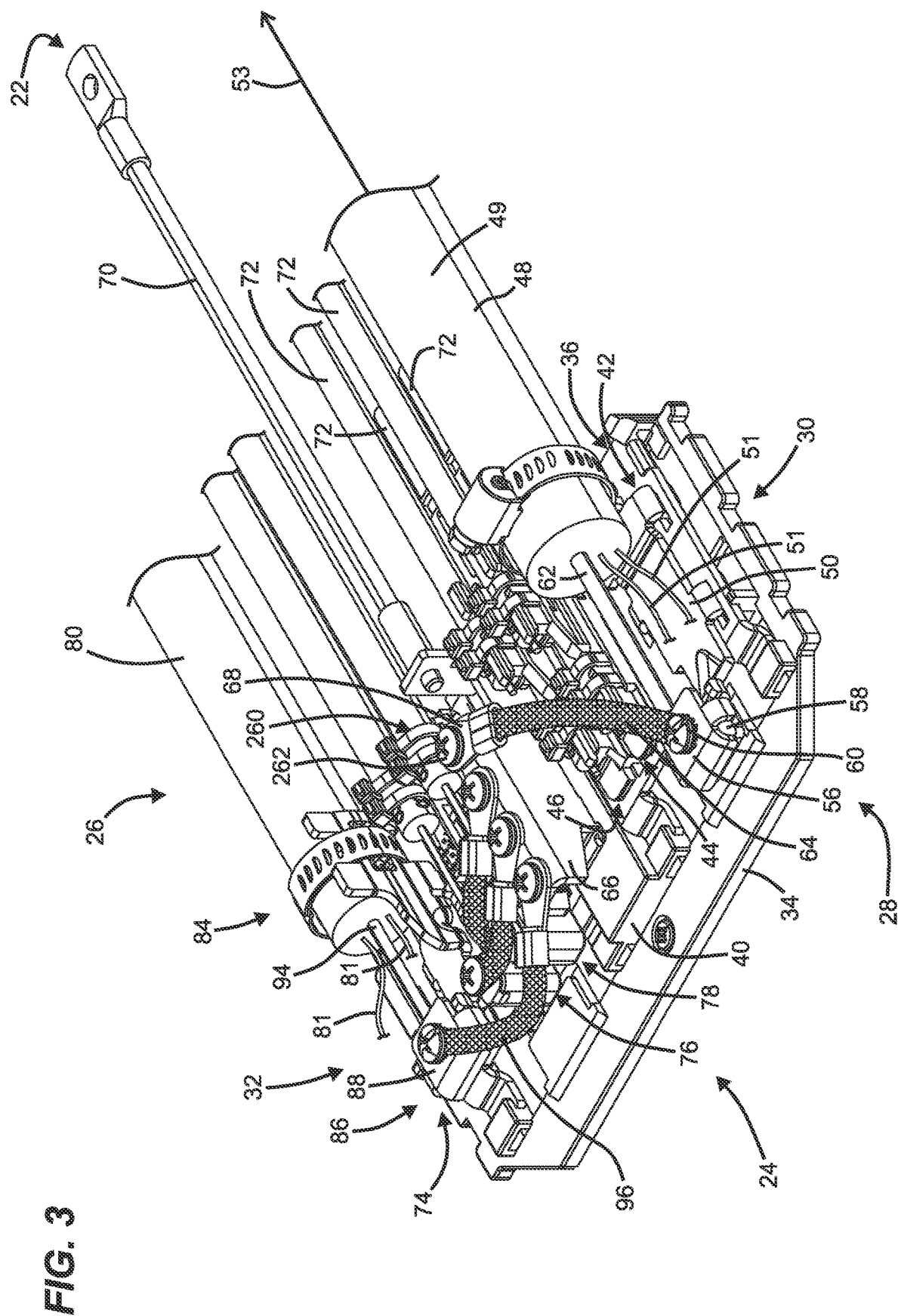
FIG. 3 is a perspective view of a cable termination assembly including an example electrical grounding assembly in accordance with the present disclosure.
Figure 4:
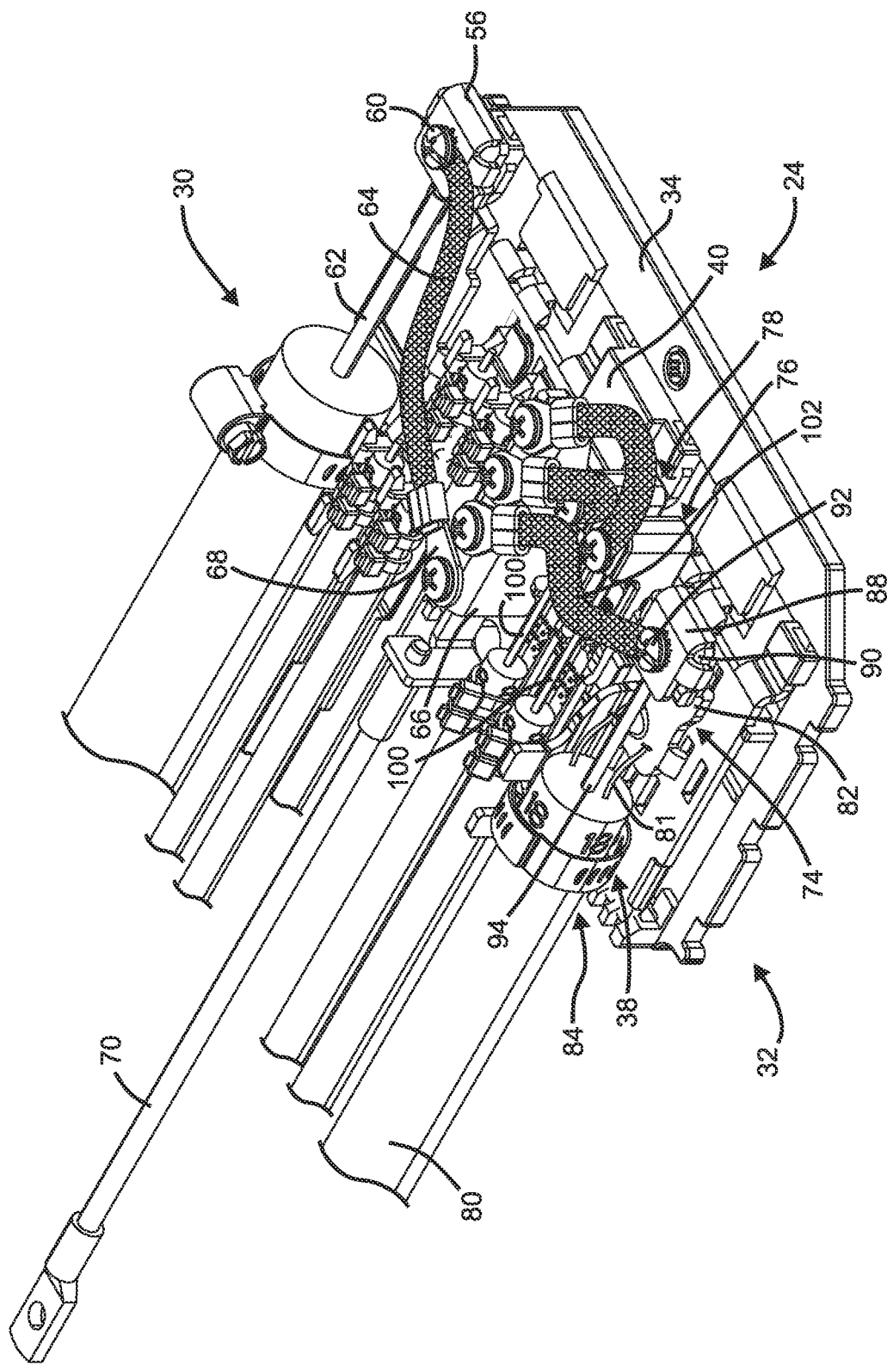
FIG. 4 is a further perspective view of the cable termination assembly of FIG. 3.
Figure 5:
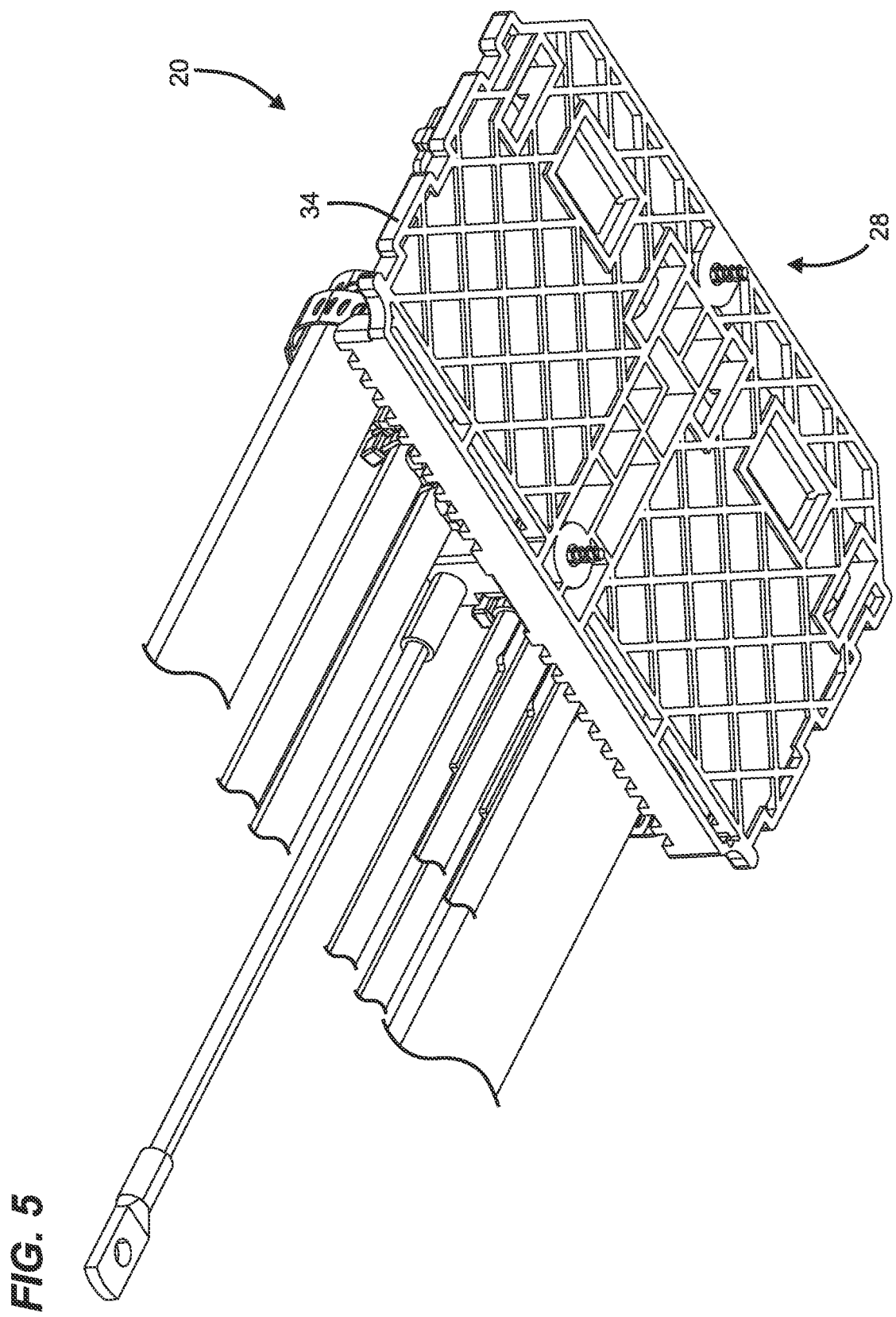
FIG. 5 is a further perspective view of the cable termination assembly of FIG. 3.
Figure 6:
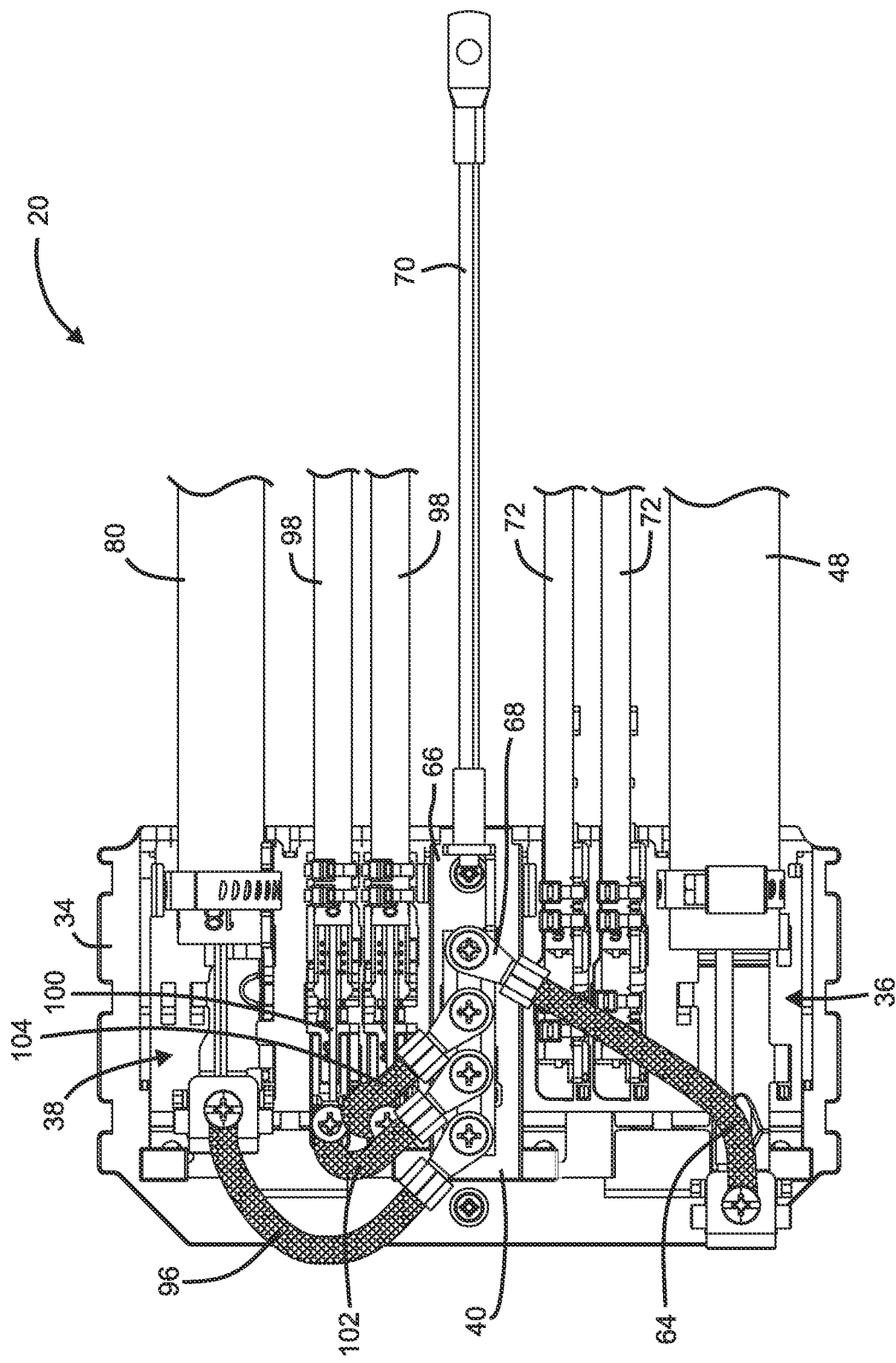
FIG. 6 is a top view of the cable termination assembly of FIG. 3.

Referring now to FIGS. 13-17, mounting of the grounding unit 66 to the divider 40 of the first region 112 of the support member 34 will be described in more detail. Mounting of the grounding unit to the support member can be accomplished in a similar manner as mounting cable fixation units to their respective plate arrangements, simplifying the overall process of assembling the assembly 20 (FIG. 3).

The grounding unit 66 includes a main body 67 defining a pair of parallel support walls 130 and 132, a top grounding conductor coupling wall 134 extending between the support walls 130 and 132, and a grounding rod interface 136. The interface 136 defines a hole 152 for receiving and securing an end of a grounding rod, such as the grounding rod 70 of FIG. 3.

A mounting portion 138 of the grounding unit 66 extends from the support walls 130, 132, and includes three hook elements 140, 142, and 144, the hook elements 140 and 144 being of identical construction. The hook elements 140 and 142 extend downward from the support wall 130, and the hook element 144 extends downward from the support wall 132, and is therefore transversely (transverse to the longitudinal axis) offset from the hook elements 140 and 142, thereby providing greater stability against rotation when the grounding unit 66 is mounted to the support member 34. Each of the hook elements 140, 142, 144 includes a leg 146 extending downward from the corresponding support wall, and a foot 148 extending generally perpendicular and proximally from the corresponding leg, the leg and foot forming a hook. The hook element 142 also includes a heel 150 at a distal side of the corresponding leg.

Figure 14:
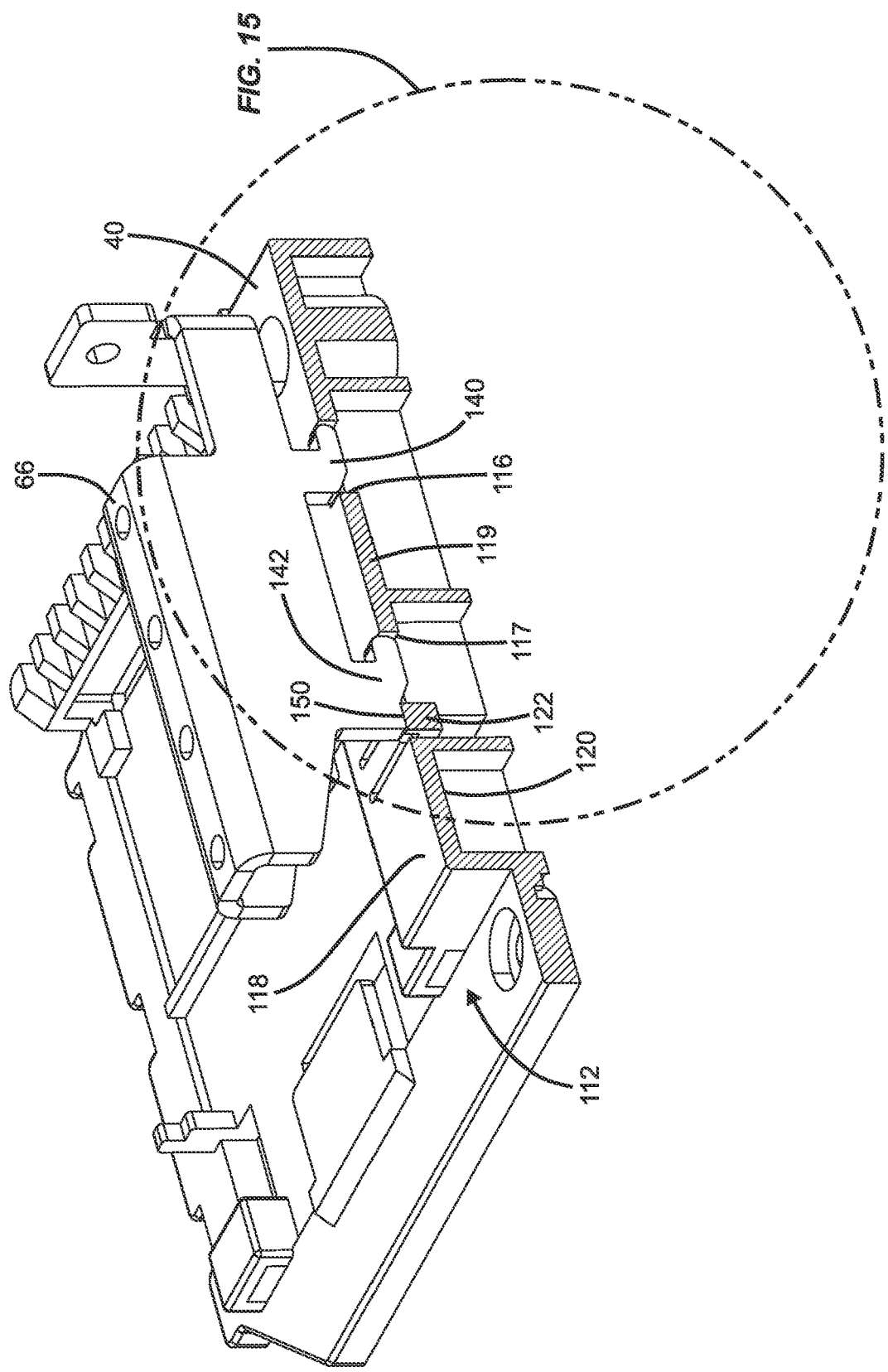
FIG. 14 is a cross-sectional perspective view of the support member and grounding unit of FIG. 13 showing a position of the grounding unit relative to the support member prior to being mounted to the support member.
Figure 15:
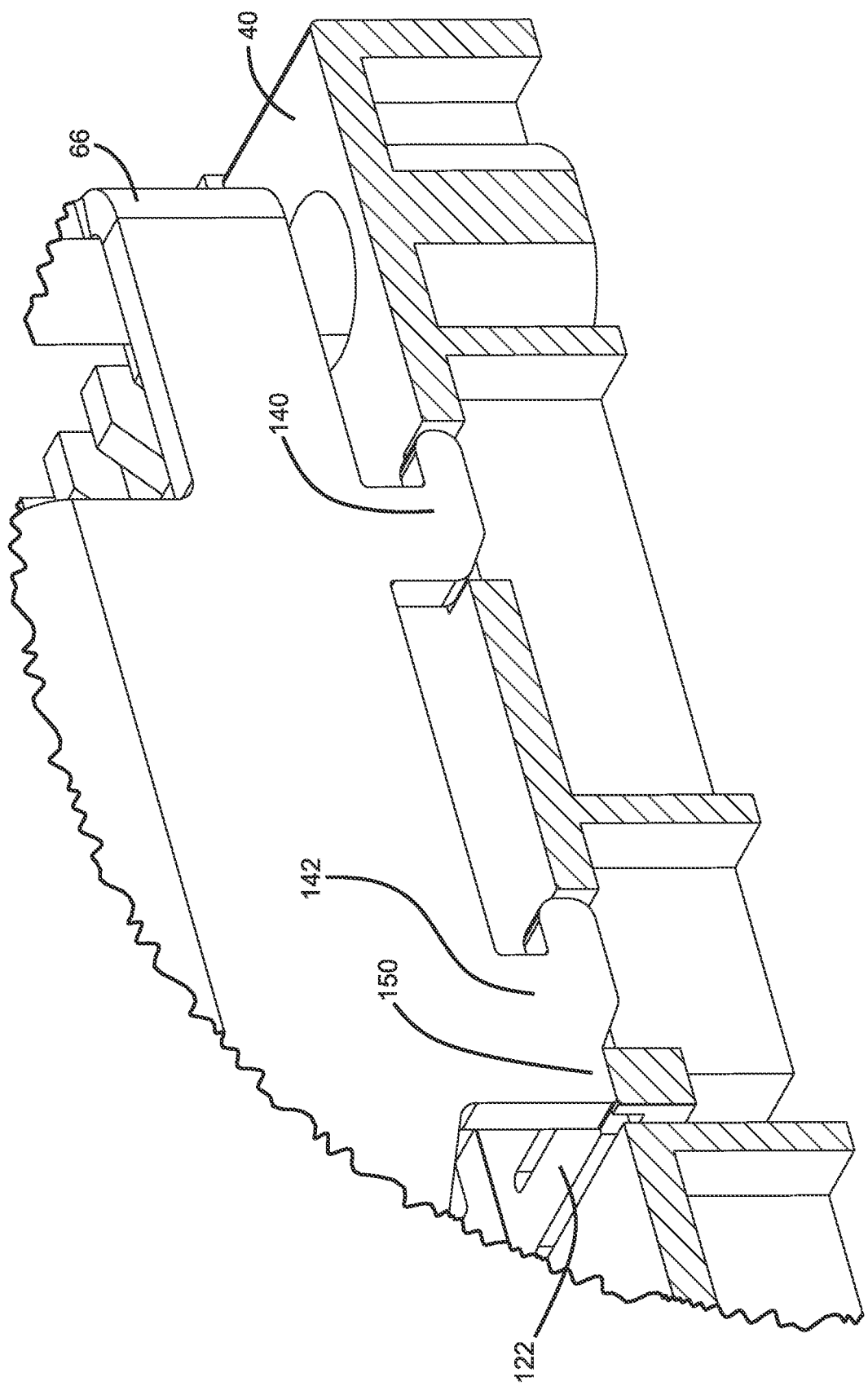
FIG. 15 is an enlarged view of a portion of the view of FIG. 14.
Figure 16:
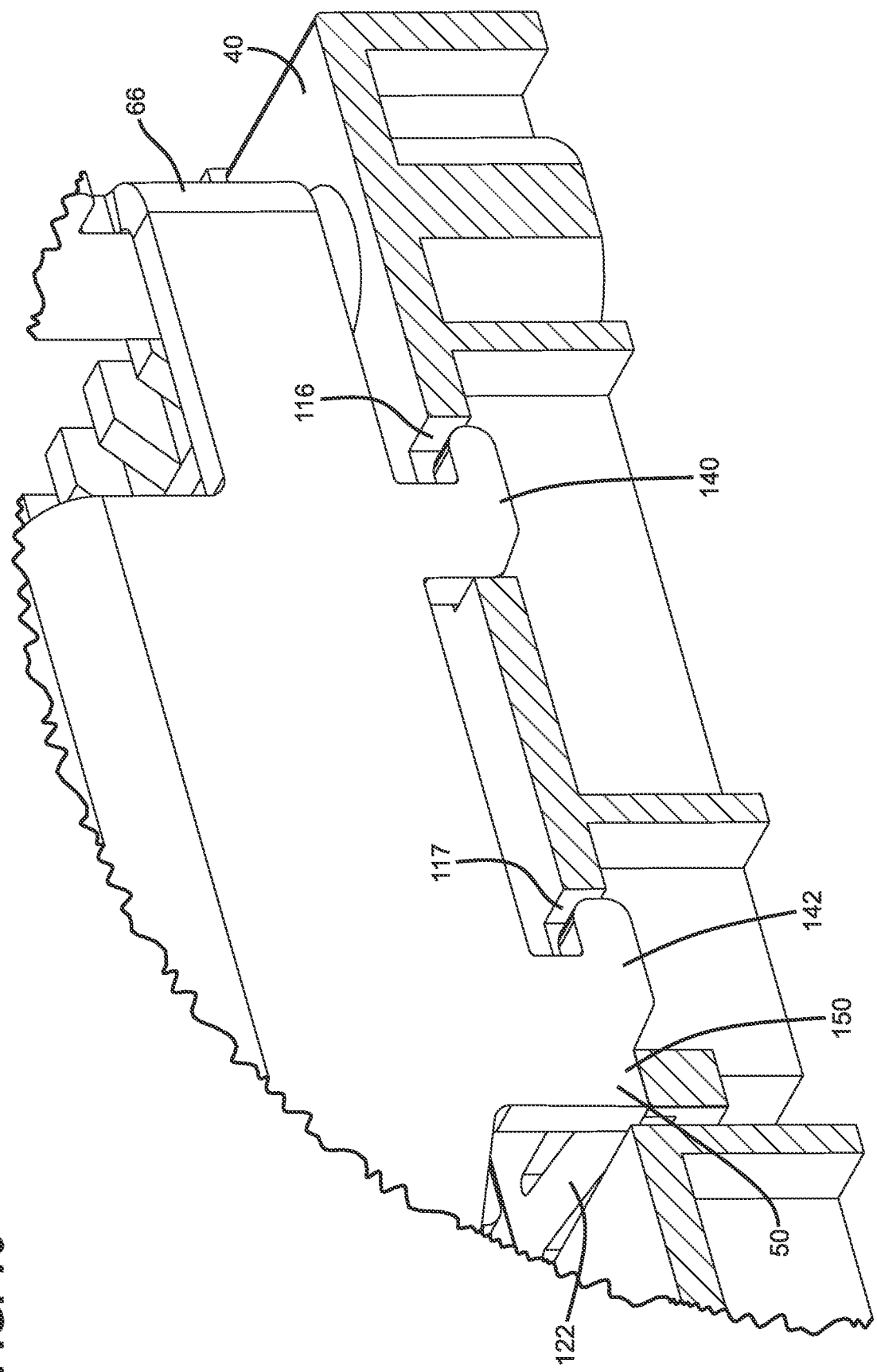
FIG. 16 is cross-sectional perspective view of a portion of the support member and the grounding unit of FIG. 13 showing a further position of the grounding unit relative to the support member as the grounding unit is being mounted to, or demounted from, the support member.
Figure 17:
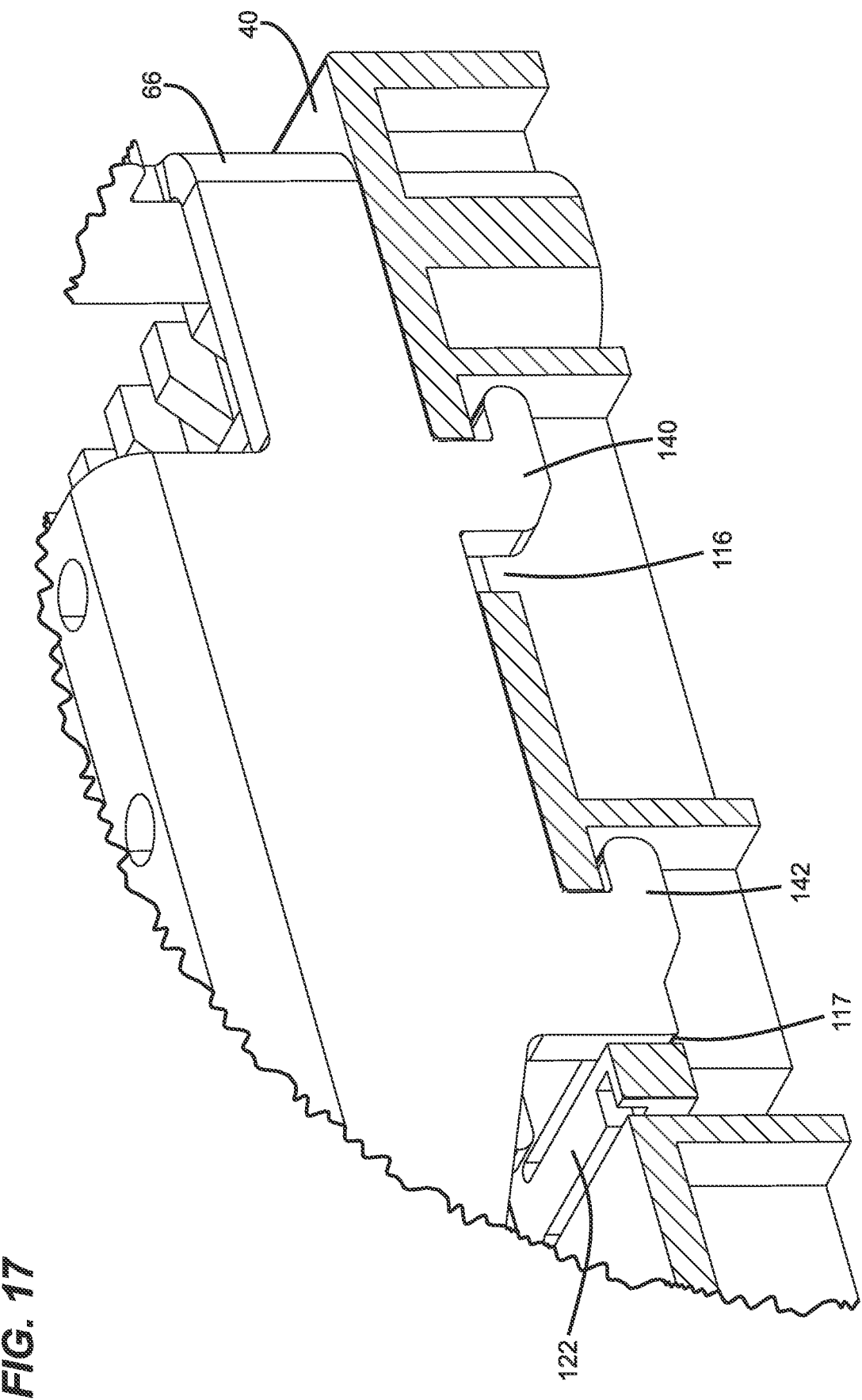
FIG. 17 is a cross-sectional perspective view of a portion of the support member and the grounding unit of FIG. 13 showing a further position of the grounding unit relative to the support member in which the grounding unit is mounted to the support member.

Referring to FIGS. 14-15, when mounting the grounding unit 66, the heel 150 is positioned to be able to push downward on the free end of the resilient member 122. Referring to FIG. 16, the grounding unit 66 is then pressed downward to deflect the free end of the resilient member 122, allowing the hook elements 140, 142 to further enter their respective slots 116, 117, while at the same time the hook element 144 further enters its respective transversely offset slot 116. Once the feet vertically clear their respective lots, the grounding unit 66 is slid proximally such that the hook elements are fully engaged with the divider 40 and the resilient member 122 resiliently returns to its relaxed configuration, as illustrated in FIG. 17, thereby lockingly mounting the grounding unit 66 to the support member 34 by blocking distal movement of the grounding unit that would be needed for the proximal ends of the feet of the hook elements to distally clear the proximal ends of the corresponding slots. To remove the grounding unit 66 from the support member 34, the resilient member 122 can be flexed downward and the grounding unit slid distally until the feet distally clear the proximal ends of the corresponding slots 116, 117, at which point the grounding unit 66 can be lifted out of engagement with the support member 34.

Figure 18:
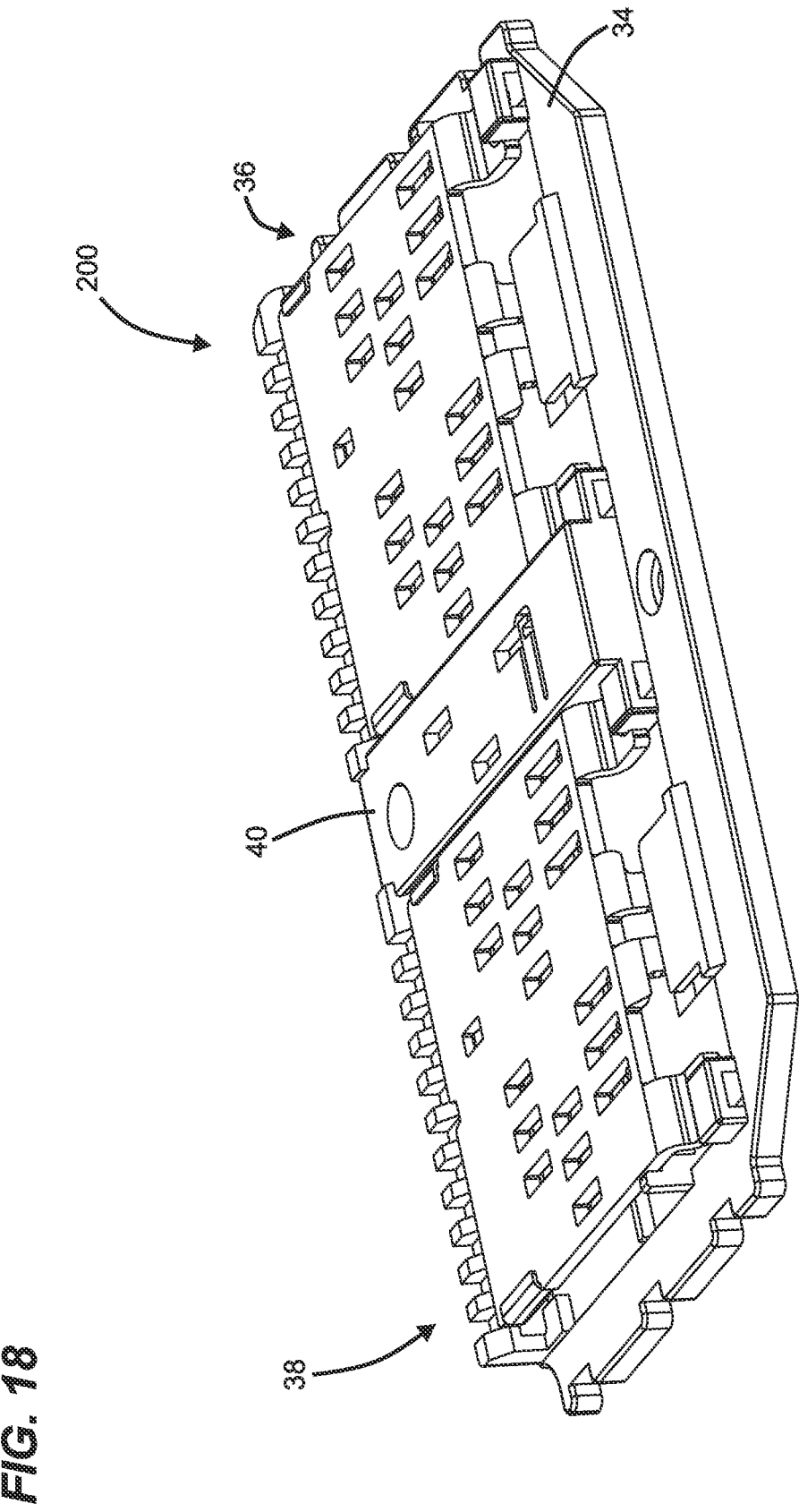
FIG. 18 is a perspective view of the base plate assembly of the cable termination assembly of FIG. 3.
Figure 19:
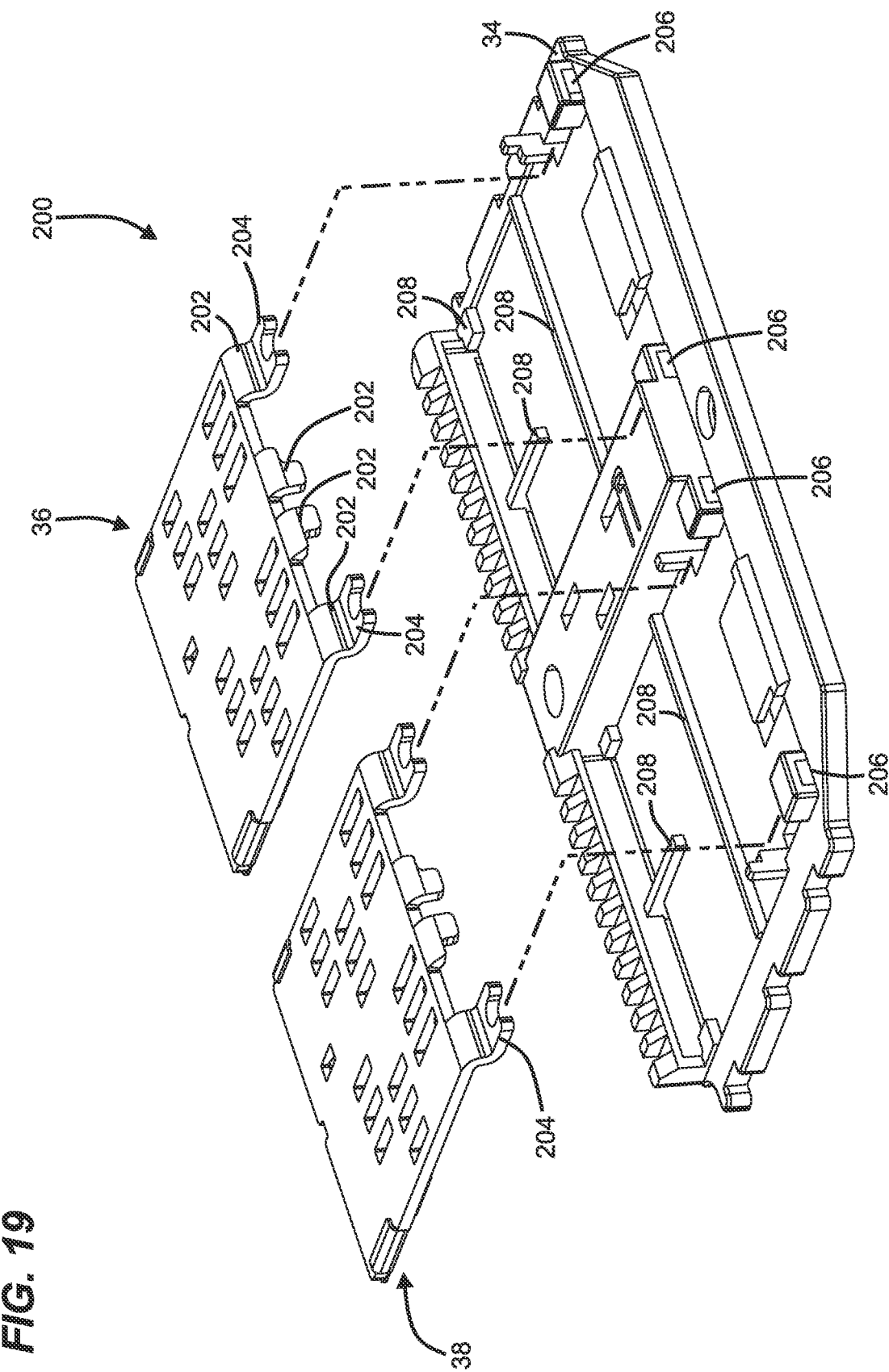
FIG. 19 is a partially exploded, perspective view of the base plate assembly of FIG. 18.
Figure 20:
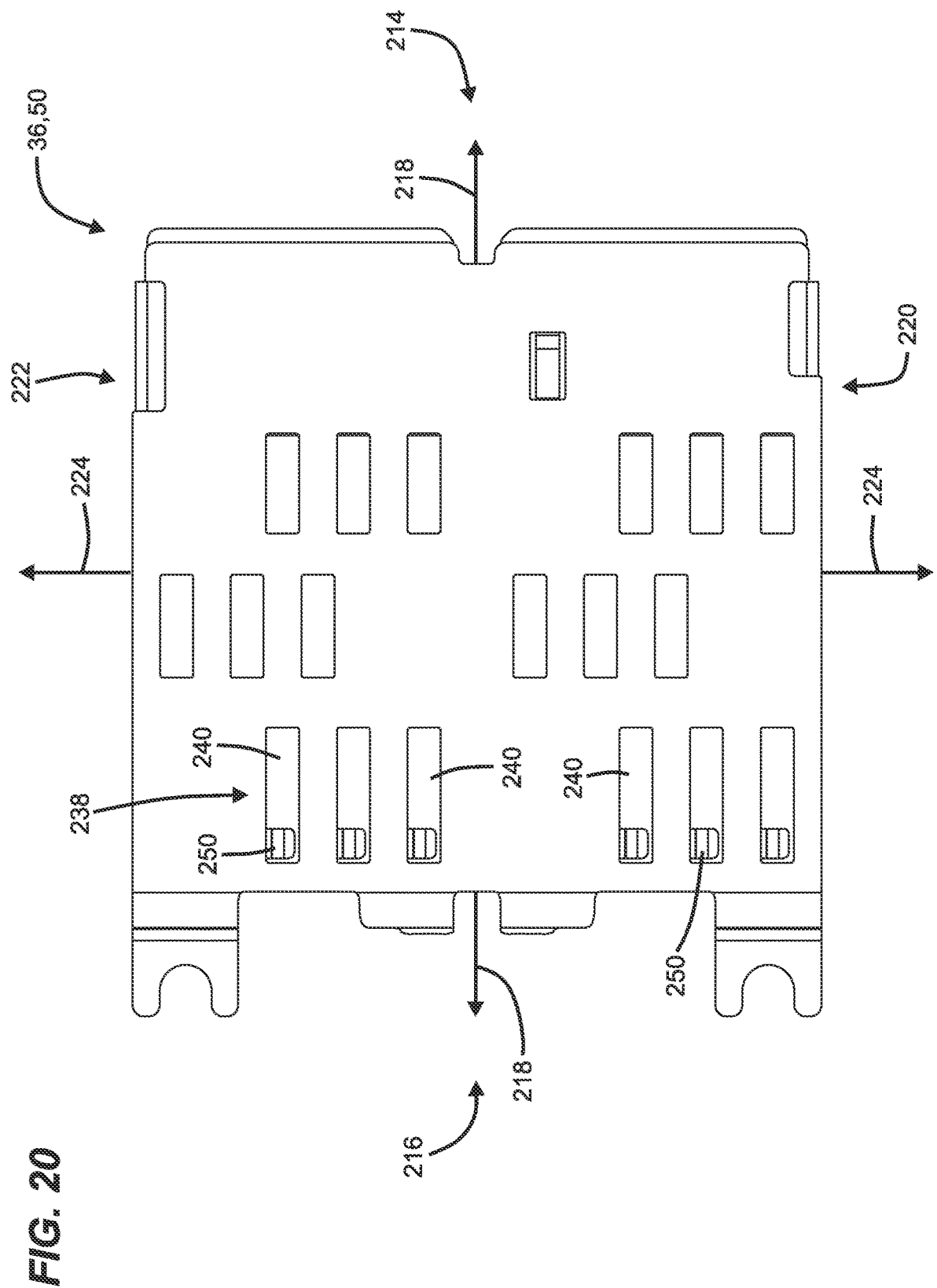
FIG. 20 is a top view of a plate arrangement of the base plate assembly of FIG. 18.
Figure 21:
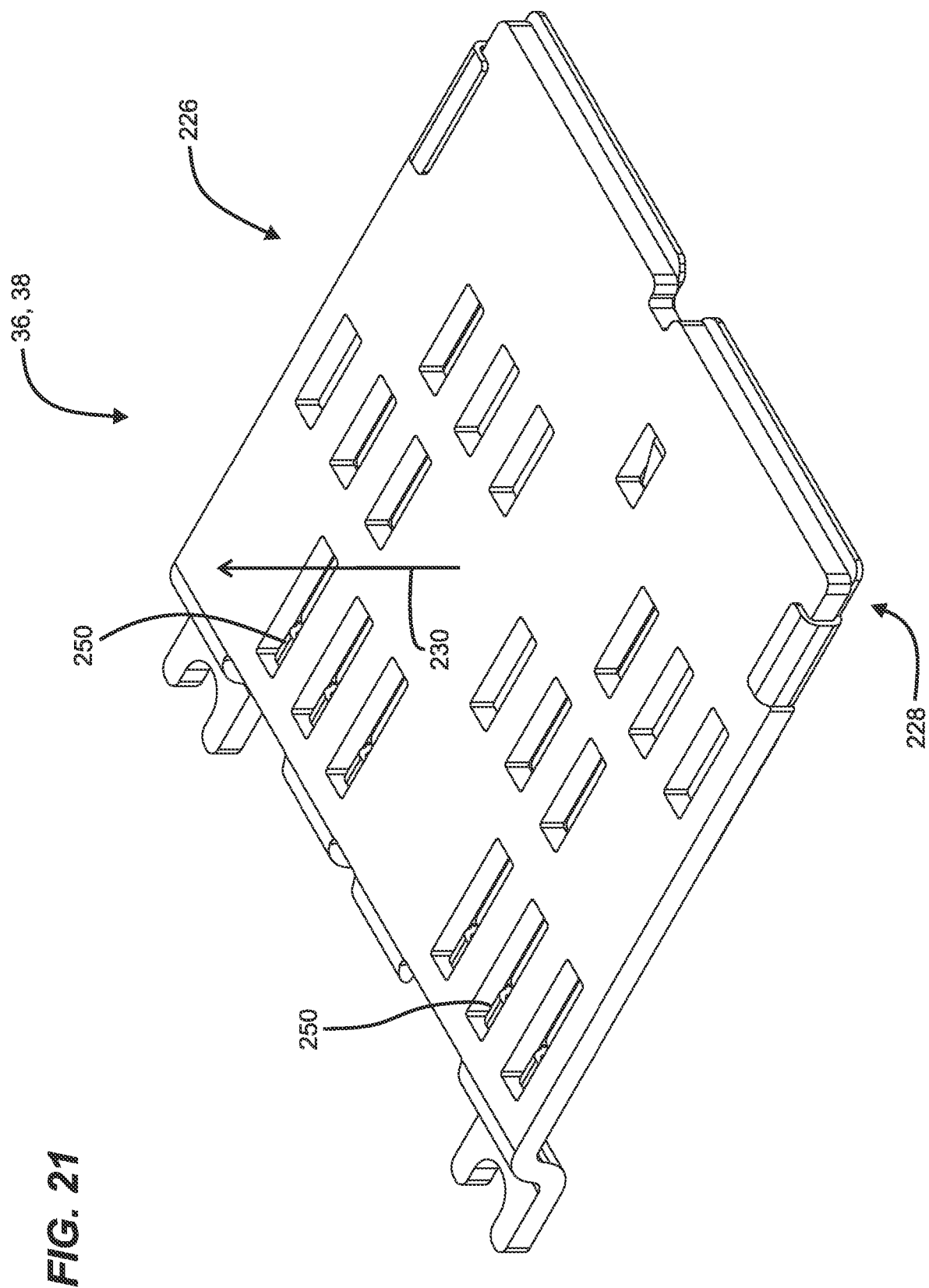
FIG. 21 is a perspective view of a plate arrangement of the base plate assembly of FIG. 18.
Figure 22:
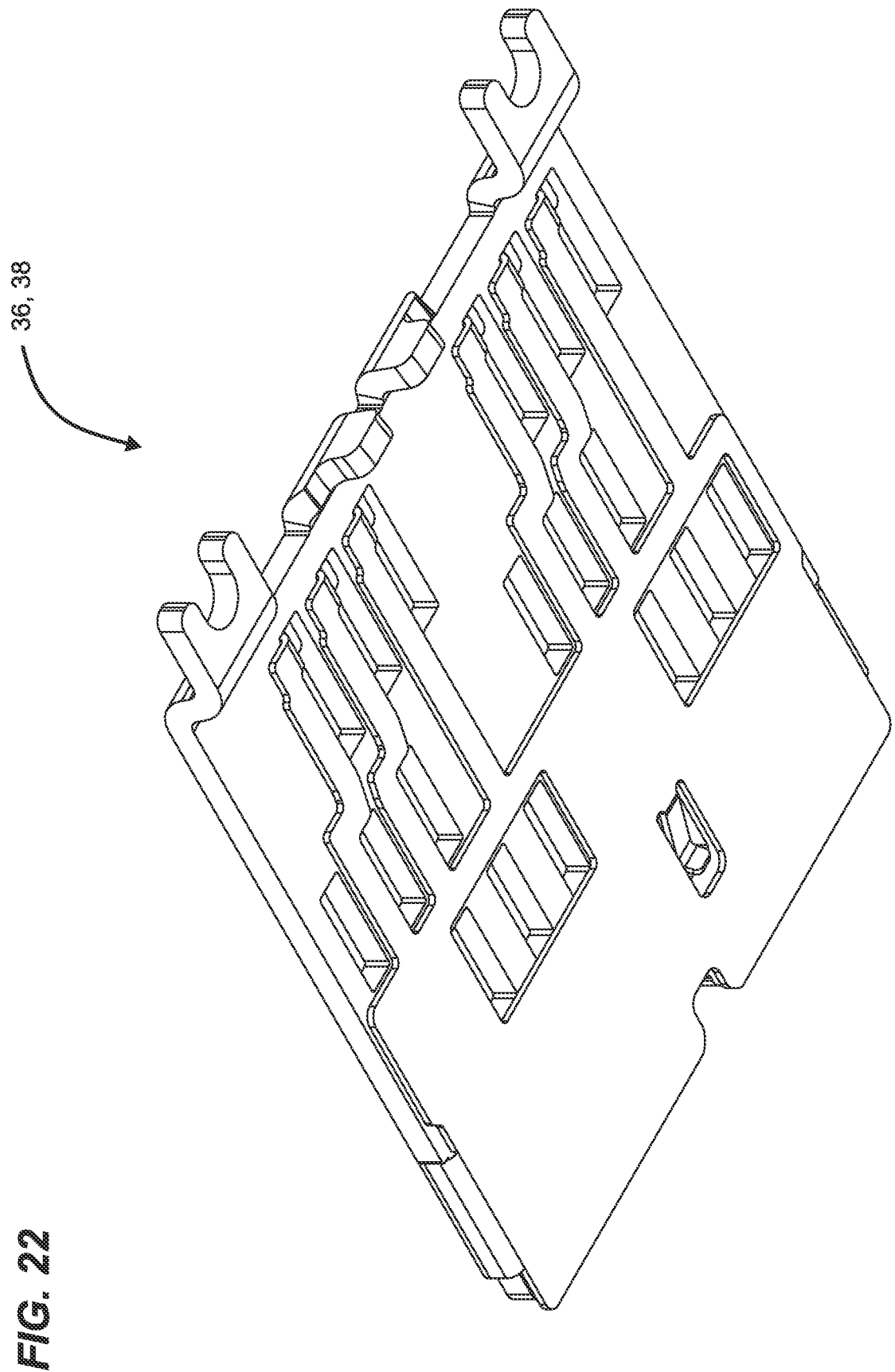
FIG. 22 is a further perspective view of a plate arrangement of FIG. 18.
Figure 23:
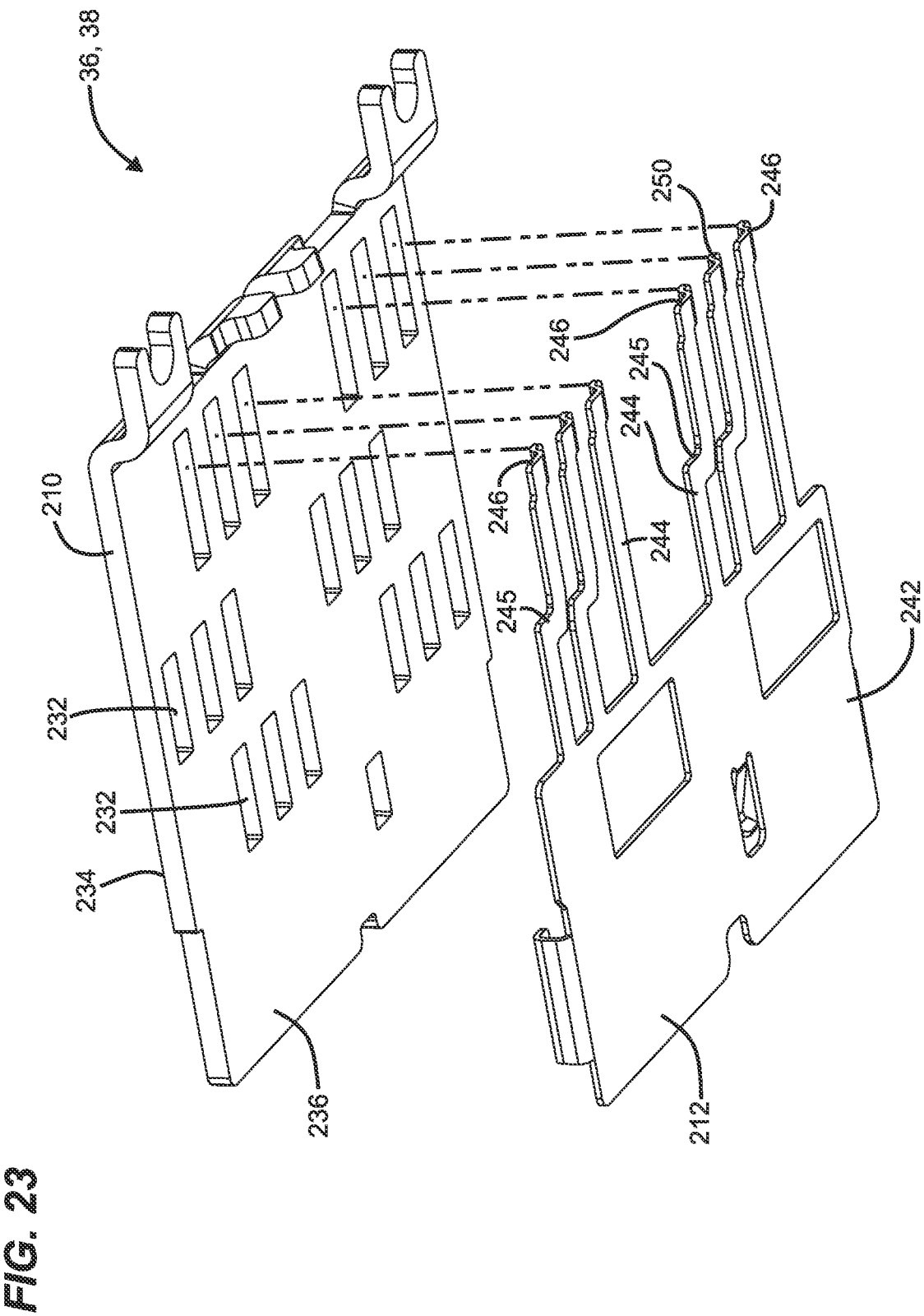
FIG. 23 is a partially exploded, perspective view of a plate arrangement of FIG. 18.

Referring to FIGS. 18-19, the base plate assembly 200 of the cable termination assembly 20 (FIG. 3) includes the support member 34 and the two plate arrangements 36 and 38 mounted thereto on opposite sides of the divider 40. Each plate arrangement 36, 38 includes legs 202 and feet 204 extending from two of the legs 202. The feet 204 are received in receivers 206 defined by the support member 34, and can be secured to the support member 34 with fasteners. The support member 34 defines vertical spacers 208. The legs and feet of the plate arrangements and the spacers of the support member vertically space the plate arrangements from the support member to define the vertical spaces 110 (FIG. 9) on either side of the divider 40.

Referring now to FIGS. 20-23 each plate arrangement 36, 38 includes an upper base plate member 210 and a lower base plate member 212 that couples to the upper base plate member 210. The plate arrangement 36, 38 extends between a proximal end 214 and a distal end 216 along a longitudinal axis 218, between a side 220 and an opposite side 222 along a transverse axis 224, and between a top 226 and a bottom 228 along a vertical axis 230.

The upper base plate member 210 includes a plurality of slots 232 extending vertically through the top surface 234 and bottom surface 236 of the upper base plate member 210 and adapted to receive hook elements of cable fixation assemblies as described above. The distal most transverse row 238 of slots 240 are locking slots configured to lockingly cooperate with heel portions of hook elements of mounting portions of cable fixation assemblies. In particular, the lower base plate member 212 includes a body 242 with a plurality of resilient members 244 extending generally longitudinally from the body to free ends 246 of the resilient members 244 configured to be positioned above or within locking slots of the upper base plate member 210. Some or all of the resilient members 244 include elbows 245 which can help to maintain the resilience of the resilient members 248 over repeated flexions. Tabs 250 positioned at the free ends 246 can provide easily accessible engagement surfaces for the heel portions of hook elements of mounting portions of cable fixation assemblies to flex the resilient members 244 when installing cable fixation assemblies to the base plate assembly 200. In the flexed configuration (e.g., when the feet of a cable fixation assembly may be advanced proximally under the upper base plate member 210), at least a portion of the tab 250 of the corresponding flexed resilient member 244 is positioned within the corresponding locking slot 240.

Figure 26:
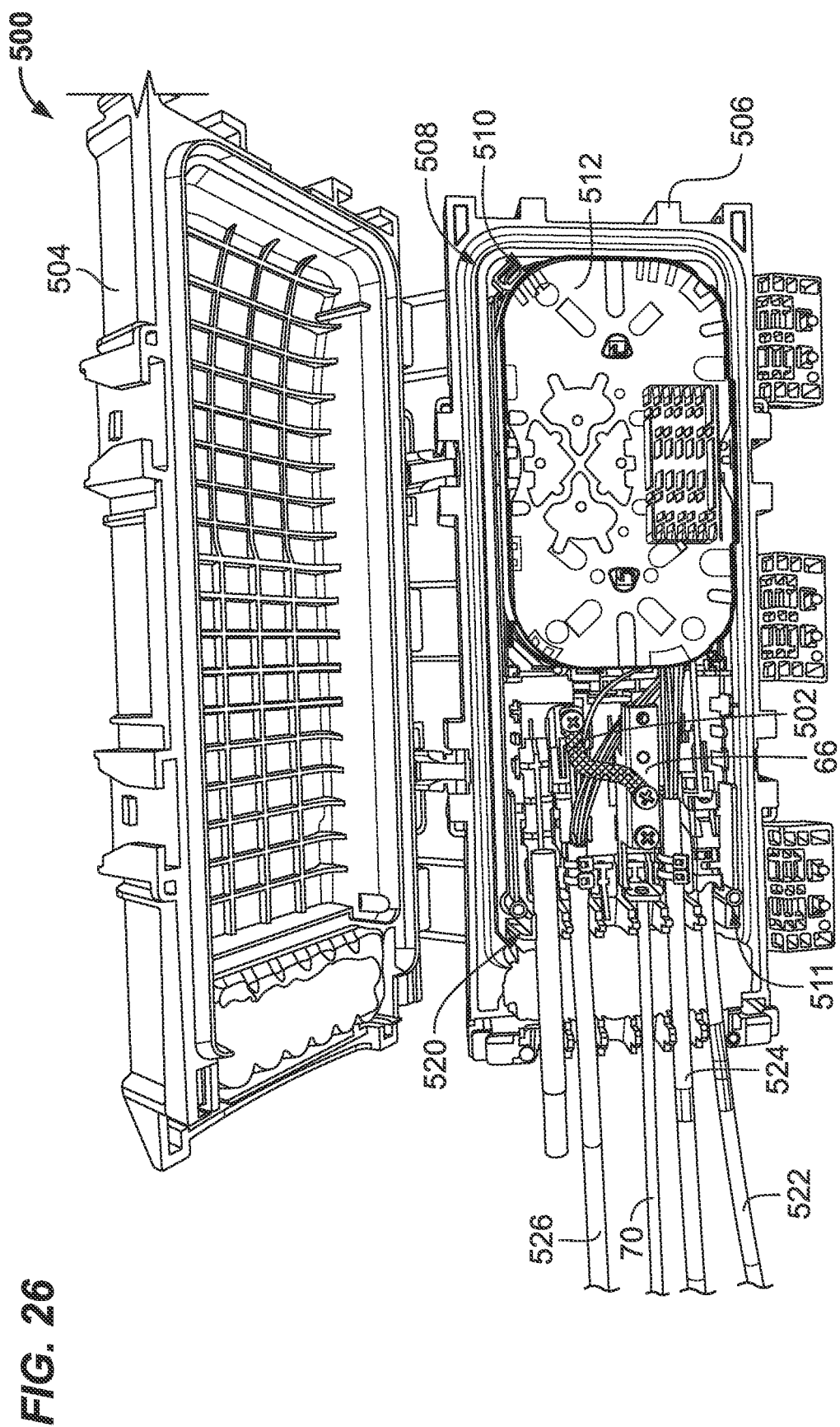
FIG. 26 is a perspective view of a further example telecommunications closure in accordance with the present disclosure, including a cable termination assembly in accordance with the present disclosure.

Referring to FIG. 26, a further example telecommunications closure 500 is shown, the closure 500 being in an open configuration. The closure 500 includes a first housing piece 504 and a second housing piece 506 that hingedly cooperate to open and close the closure 500 and define a sealable interior volume 508 that includes a fiber organizing area 510 and a cable fixation area 511 in which a cable termination assembly 520 is positioned. Cables 522, 524, 526 enter the closure 500 through sealable ports defined between the two housing pieces 504 and 506. Optical fibers from the fixated cables can be organized in the fiber organizing area 510, e.g., by routing and splicing the fibers on splice trays 512.

The cable 526 includes an electrically conductive strength rod that is grounded via the strength rod anchoring portion of the cables cable fixation assembly. A grounding conductor 502 provides an electrical path from the strength rod anchoring portion to the grounding unit 66, and the electrical path then continues outside the closure 500 via the grounding rod 70.

Figure 27:
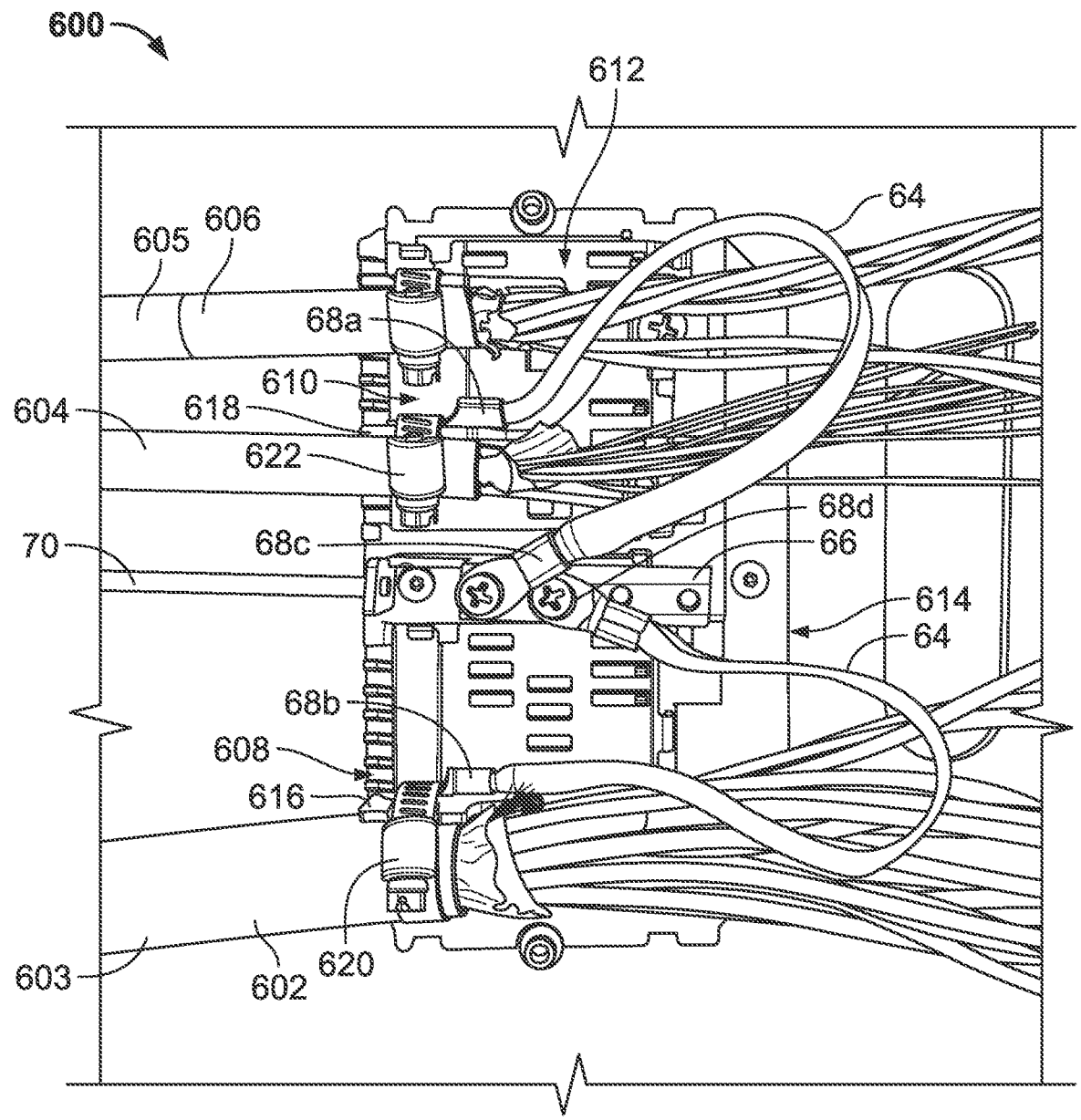
FIG. 27 is a top planar view of a further example cable termination assembly in accordance with the present disclosure.

Referring to FIG. 27, a further example cable termination assembly 600 is shown, the assembly 600 being mountable in a telecommunications closure. Cables 602, 604, and 606 are fixed to cable fixation assemblies 608, 610, 612 respectively, which are mounted to a base plate assembly 614.

Each of the cables 602 and 604 includes a conductive shield within the outer jacket 603, 605, respectively. The conductive shields are electrically grounded via the grounding rod 70 that extends outside a closure. Electrically conductive bodies 616, 618 of the fixation assemblies 608, 610, respectively, contact the conductive shields.

Grounding conductors 64 conductively connect bodies 616, 618 to the grounding unit 66. The grounding conductors 64 are terminated at opposite ends with electrically conductive grounding conductor couplers (e.g., eyelets) 68a, 68c, 68b, 68d.

Electrically conductive cable clamping devices 620, 622 (e.g., hose clamps), clamp the eyelets 68a, 68b to a side of the respective body 616, 618, while the eyelets 68c an 68d are secured to the grounding unit 66, thereby establishing an electrically conductive pathway from the cable conductive shields to the fixation assembly bodies 616, 618 to the eyelets 68a, 68b to the grounding conductors 64 to the eyelets 68c, 68d to the grounding unit 66 to the grounding rod 70. Thus, grounding conductors are not secured to strength rod anchoring portions of the cable fixation assemblies. In alternative examples, additional grounding conductors are provided to ground strength rods of the cables by providing grounding pathways from the strength rod anchoring portions of the cable fixation assemblies to the grounding unit as described above. Thus, grounding assemblies in accordance with the present disclosure can provide grounding pathways from a cable conductive shield, from a cable strength rod, or from both the conductive shield and the strength rod.

As used herein, words such as top, bottom, proximal, distal, longitudinal, transverse, vertical, horizontal, etc., are used to aid description of the orientations of components of assemblies relative to one another and are not intended to limit how the assemblies are used or positioned in use.

From the foregoing detailed description, it will be evident that modifications and variations can be made in the devices of the disclosure without departing from the spirit or scope of the invention.

What is claimed is:

1. An electrical grounding assembly for a telecommunications closure, comprising:
    a grounding unit extending vertically from a top to a bottom and including:
        a main body;
        a grounding conductor coupler supported by the main body; and
        a mounting portion supported by the main body, the mounting portion including a plurality of grounding unit hook elements; and
    a base plate having a top surface and a bottom surface and a plurality of slots extending through the top surface and the bottom surface that receive the grounding unit hook elements.

2. An electrical grounding assembly for a telecommunications closure, comprising:
    a grounding unit extending vertically from a top to a bottom and including:
        a main body;
        a grounding conductor coupler supported by the main body; and
        a mounting portion supported by the main body, the mounting portion including a plurality of grounding unit hook elements, the grounding unit hook elements being configured to engage slots of a base plate,
    wherein the grounding unit body includes at least four grounding conductor couplers.

3. An electrical grounding assembly for a telecommunications closure, comprising:
    a grounding unit extending vertically from a top to a bottom and including:
        a main body;
        a grounding conductor coupler supported by the main body; and
        a mounting portion supported by the main body, the mounting portion including a plurality of grounding unit hook elements; and
    a base plate assembly, including:
        a support member defining a first region and a second region adjacent the first region, the first region including a plurality of first slots extending between an upper surface and a lower surface of the first region, the first slots configured to engage the grounding unit hook elements to lockingly mount the grounding unit to the support member; and
        a first plate arrangement coupled to the support member and positioned at the second region, the first plate arrangement including a plurality of second slots extending between an upper surface and a lower surface of the first plate arrangement, the second slots being configured to engage hook elements of at least one first cable fixation assembly, the first plate arrangement and the second region of the support member defining a first vertical space therebetween to accommodate the hook elements of the at least one first cable fixation assembly.

4. The electrical grounding assembly of claim 3,
    wherein the support member defines a third region, the second and third regions being disposed on opposite sides of the first region, and
    wherein the base plate assembly includes a second plate arrangement including a plurality of third slots extending between an upper surface and a lower surface of the second plate arrangement, the third slots being configured to engage hook elements of at least one second cable fixation assembly, the second plate arrangement and the second region of the support member defining a second vertical space therebetween to accommodate the hook elements of the at least one second cable fixation assembly.

5. The electrical grounding assembly of claim 4, wherein the first region includes a divider between the second and third regions, the first slots being positioned in an upper wall of the divider, the upper wall being positioned above the second and third regions.

6. The electrical grounding assembly of claim 4, including at least two cable fixation assemblies mounted to at least one of the first and second plate arrangements, and grounding conductors conductively connecting the at least two cable fixation assemblies to the grounding unit.

7. The electrical grounding assembly of claim 6, wherein the grounding conductors are coupled to the grounding conductor coupler.

8. The electrical grounding assembly of claim 6, wherein the grounding conductor coupler is a first grounding conductor coupler, wherein the grounding unit includes a second grounding conductor coupler, wherein one of the grounding conductors connects a first of the cable fixation assemblies to the first grounding conductor coupler, and wherein another of the grounding conductors connects a second of the cable fixation assemblies to the second grounding conductor coupler.

9. The electrical grounding assembly of claim 6, wherein each of the grounding conductors includes a braid terminated by an eyelet.

10. The electrical grounding assembly of claim 4, wherein each of the first and second plate arrangements includes:
    an upper base plate member defining the corresponding second or third slots, the corresponding second or third slots defining a plurality of side by side mounting positions for mounting cable fixation assemblies arranged side by side, a slot of each of the mounting positions being a locking slot, a resilient member being positioned at least partially within each of the locking slots, each of the resilient members extending between a fixed end and an opposite free end, each of the resilient members having a relaxed configuration and a flexed configuration, wherein in the relaxed configuration the free end of the resilient member is positioned to block a hook element of a mounting portion of a cable fixation assembly from contacting the distal end of the corresponding locking slot when the cable fixation assembly is mounted to the corresponding upper base plate.

11. The electrical grounding assembly of claim 10, wherein each of the first and second plate arrangements includes a lower base plate member that cooperates with the upper base plate member, and wherein the lower base plate member includes the corresponding resilient members.

12. The electrical grounding assembly of claim 3, wherein the first and second plate arrangements comprise an electrically conductive material.

13. The electrical grounding assembly of claim 3, wherein the support member comprises a non-electrically conductive material.

14. The electrical grounding assembly of claim 3, wherein the first slots include a locking slot, a resilient member being positioned at least partially within the locking slot, the resilient member extending between a fixed end and an opposite free end, the resilient member having a relaxed configuration and a flexed configuration, wherein in the relaxed configuration the free end of the resilient member is positioned to block distal movement of one of the grounding unit hook elements when the grounding unit is mounted to the support member.

15. An electrical grounding assembly for a telecommunications closure, comprising:
  a support member, the support member including a vertically projecting divider, the support member being configured to support plate arrangements in regions defined by the support member on opposite sides of the divider that are vertically below a top of the divider, the plate arrangements being configured to mount cable fixation assemblies; and
  a grounding unit extending vertically from a top to a bottom and including:
    a main body;
    a grounding conductor coupler supported by the main body; and
    a mounting portion supported by the main body, the mounting portion including a plurality of grounding unit hook elements, the grounding unit hook elements being configured to mount the grounding unit to the divider.

16. The electrical grounding assembly of claim 15, wherein the main body includes a plurality of grounding conductor couplers vertically spaced apart one from another.

17. The electrical grounding assembly of claim 15, wherein the grounding conductor coupler includes an electrically conductive fastener adapted to fasten a grounding conductor to the main body.

18. The electrical grounding assembly of claim 15, further comprising a grounding rod or a grounding wire connected to the grounding unit, the grounding rod or the grounding wire adapted to extend through to an exterior of a telecommunications closure housing the grounding unit through a port defined by the telecommunications closure.

19. The electrical grounding assembly of claim 15, wherein the grounding unit is configured to serve as a common grounding connection for a plurality of telecommunications cables having multiple transverse diameters and affixed within an interior volume of a telecommunications closure housing the grounding unit.

20. A telecommunications closure, comprising:
  first and second housing pieces configured to cooperate to define a sealable and re-enterable fiber management volume;
  a cable fixation assembly positioned within the fiber management volume;
  a telecommunications cable extending into the fiber management volume through a port defined by one or both of the first and second housing pieces and fixed to the cable fixation assembly; and
  the electrical grounding assembly according to claim 1, the electrical grounding assembly being positioned within the fiber management volume and electrically grounding the telecommunications cable.

21. The electrical grounding assembly of claim 15, further comprising:
  a grounding conductor coupled at one end to the grounding unit and at an opposite end to a body of a cable fixation assembly via a cable clamping device.

22. The electrical grounding assembly of claim 15, further comprising:
  a grounding conductor coupled at one end to the grounding unit and at an opposite end to a strength rod anchoring portion of a cable fixation assembly.

23. The electrical grounding assembly of claim 15, further comprising:
  a first grounding conductor coupled at one end to the grounding unit and at an opposite end to a body of a cable fixation assembly via a cable clamping device; and
  a second grounding conductor coupled at one end to the grounding unit and at an opposite end to a strength rod anchoring portion of the cable fixation assembly.

* * * * *